US 11,163,224 B2

(12) United States Patent  (10) Patent No.: US 11,163,224 B2
Sugiyama  (45) Date of Patent: Nov. 2, 2021

(54) PROJECTOR

(71) Applicant: SEIKO EPSON CORPORATION, Tokyo (JP)

(72) Inventor: Nobuo Sugiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/066,529

(22) Filed: Oct. 9, 2020

(65) Prior Publication Data

US 2021/0109429 A1    Apr. 15, 2021

(30) Foreign Application Priority Data

Oct. 11, 2019 (JP) .............................. JP2019-187668

(51) Int. Cl.
*G03B 21/16* (2006.01)
*F25B 15/00* (2006.01)
*G03B 33/12* (2006.01)

(52) U.S. Cl.
CPC ............ *G03B 21/16* (2013.01); *F25B 15/004* (2013.01); *G03B 33/12* (2013.01)

(58) Field of Classification Search
CPC ........ G03B 21/16; G03B 33/12; F25B 15/044
USPC ......................................................... 353/54
See application file for complete search history.

(56) References Cited

U.S. PATENT DOCUMENTS

| 8,517,540 B2 | 8/2013 | Terao |
| 2002/0191159 A1 | 12/2002 | Nagao et al. |
| 2009/0086169 A1 | 4/2009 | Nakamura |
| 2010/0132379 A1 | 6/2010 | Wu et al. |
| 2011/0242499 A1 | 10/2011 | Terao et al. |
| 2016/0147034 A1* | 5/2016 | Shoujiguchi ........... G02B 7/028 359/512 |
| 2019/0196311 A1 | 6/2019 | Sugiyama et al. |

FOREIGN PATENT DOCUMENTS

| JP | H11-057383 A | 3/1999 |
| JP | H11-169644 A | 6/1999 |
| JP | H11-223464 A | 8/1999 |
| JP | 2002-107698 A | 4/2002 |
| JP | 2002-326012 A | 11/2002 |
| JP | 2002-372748 A | 12/2002 |
| JP | 2007-294655 A | 11/2007 |
| JP | 2009-086271 A | 4/2009 |

(Continued)

*Primary Examiner* — Jerry L Brooks
(74) *Attorney, Agent, or Firm* — Dority & Manning, P.A.

(57) ABSTRACT

A projector includes a cooler configured to cool a cooling target based on transformation of a refrigerant into a gas. A refrigerant generator of the cooler includes a first blower configured to deliver air to a first portion of a moisture absorbing/discharging member, a first heat exchanger, a heater, a second blower, a circulation path along which the air exhausted from the second blower circulates, and a second heat exchanger provided in the circulation path. The circulation path has a first path along which air after passing through a second portion of the moisture absorbing/discharging member flows into the first heat exchanger and a second path along which air exhausted from the first heat exchanger is delivered to the second portion. The second heat exchanger exchanges heat between the air flowing along the first path and the air flowing along the second path.

12 Claims, 11 Drawing Sheets

(56) References Cited

FOREIGN PATENT DOCUMENTS

| | | | |
|---|---|---|---|
| JP | 2010-107751 | A | 5/2010 |
| JP | 2011-036768 | A | 2/2011 |
| JP | 2011-215457 | A | 10/2011 |
| JP | 2014-087797 | A | 5/2014 |
| JP | 2019-117332 | A | 7/2019 |

* cited by examiner

PROJECTOR

The present application is based on, and claims priority from JP Application Serial Number 2019-187668, filed Oct. 11, 2019, the disclosure of which is hereby incorporated by reference herein in its entirety.

BACKGROUND

1. Technical Field

The present disclosure relates to a projector.

2. Related Art

JP-A-2019-117332 describes a projector including a refrigerant generator that generates a refrigerant. In the projector described in JP-A-2019-117332, a cooling target in the projector is cooled based on transformation of the refrigerant generated by the refrigerant generator into a gas.

The projector described above has been required to further improve refrigerant generation efficiency of the refrigerant generator.

SUMMARY

An aspect of a projector according to the present disclosure is a projector including a cooling target, the projector including a light source configured to emit light, a light modulator configured to modulate the light emitted from the light source in accordance with an image signal, and a cooler configured to cool the cooling target based on transformation of a refrigerant into a gas. The cooler includes a refrigerant generator configured to generate the refrigerant and a refrigerant sender configured to send the generated refrigerant toward the cooling target. The refrigerant generator includes a rotating moisture absorbing/discharging member, a first blower configured to deliver air to a first portion of the moisture absorbing/discharging member that is a portion located in a first region, a first heat exchanger coupled to the refrigerant sender, a heater configured to heat a second portion of the moisture absorbing/discharging member that is a portion located in a second region different from the first region, a second blower configured to deliver air around the second portion heated by the heater to the first heat exchanger, a circulation path along which the air exhausted from the second blower circulates, and a second heat exchanger provided in the circulation path. The circulation path has a first path along which air after passing through the second portion located in the second region flows into the first heat exchanger and a second path along which air exhausted from the first heat exchanger is delivered to the second portion located in the second region. The second heat exchanger exchanges heat between the air flowing along the first path and the air flowing along the second path.

The heater may include a heating main body disposed in the second path. The heating main body may heat the air flowing through the second path. The second heat exchanger may exchange heat between the air flowing along the first path and the air flowing along the second path through a region on an upstream of the heating main body.

The second heat exchanger may include a heat transfer member, and the second heat exchanger may exchange heat between the air flowing along the first path and the air flowing along the second path via the heat transfer member.

The heat transfer member may include a base and a plurality of fins protruding from the base in the same direction. Part of the plurality of fins may be disposed in the first path, and another part of the plurality of fins may be disposed in the second path.

The second heat exchanger may include a first section that is part of the first path and a second section that is part of the second path, and one of the first and second sections may pass through the other of the first and second sections in the second heat exchanger with the one of the first and second sections isolated from the other.

The second heat exchanger may include an enclosure having an internal space forming the second section and a plurality of channels that are disposed in the internal space, the channels forming the first section.

The second heat exchanger may include a first proximity section that is part of the first path, the first proximity section disposed in a position closer to the second path than other sections of the first path and a second proximity section that is part of the second path, the second proximity section disposed in a position closer to the first path than other sections of the second path.

At least part of the first path may be formed of a first duct, and at least part of the second path may be formed of a second duct. The first proximity section may be formed of a first contact section of the first duct which is a section in contact with the second duct, and the second proximity section may be formed of a second contact section of the second duct which is a section in contact with the first contact section.

A direction in which air flows through the first proximity section may be opposite a direction in which air flows through the second proximity section.

At least part of a wall forming the first proximity section and at least part of a wall forming the second proximity section may be made of metal.

The second heat exchanger may include a heat insulating member surrounding at least part of the first path and at least part of the second path.

The cooling target may be the light modulator.

DESCRIPTION OF EXEMPLARY EMBODIMENTS

A projector according to each embodiment of the present disclosure will be described below with reference to the drawings. The scope of the present disclosure is not limited to the following embodiments and can be arbitrarily changed within the scope of the technical idea of the present disclosure. In the following drawings, for clarity of each configuration, the scale, the number, and other factors of the structure of the configuration differ from the scale, the number, and the other factors of the actual structure of the configuration in some cases.

First Embodiment

Figure 1:
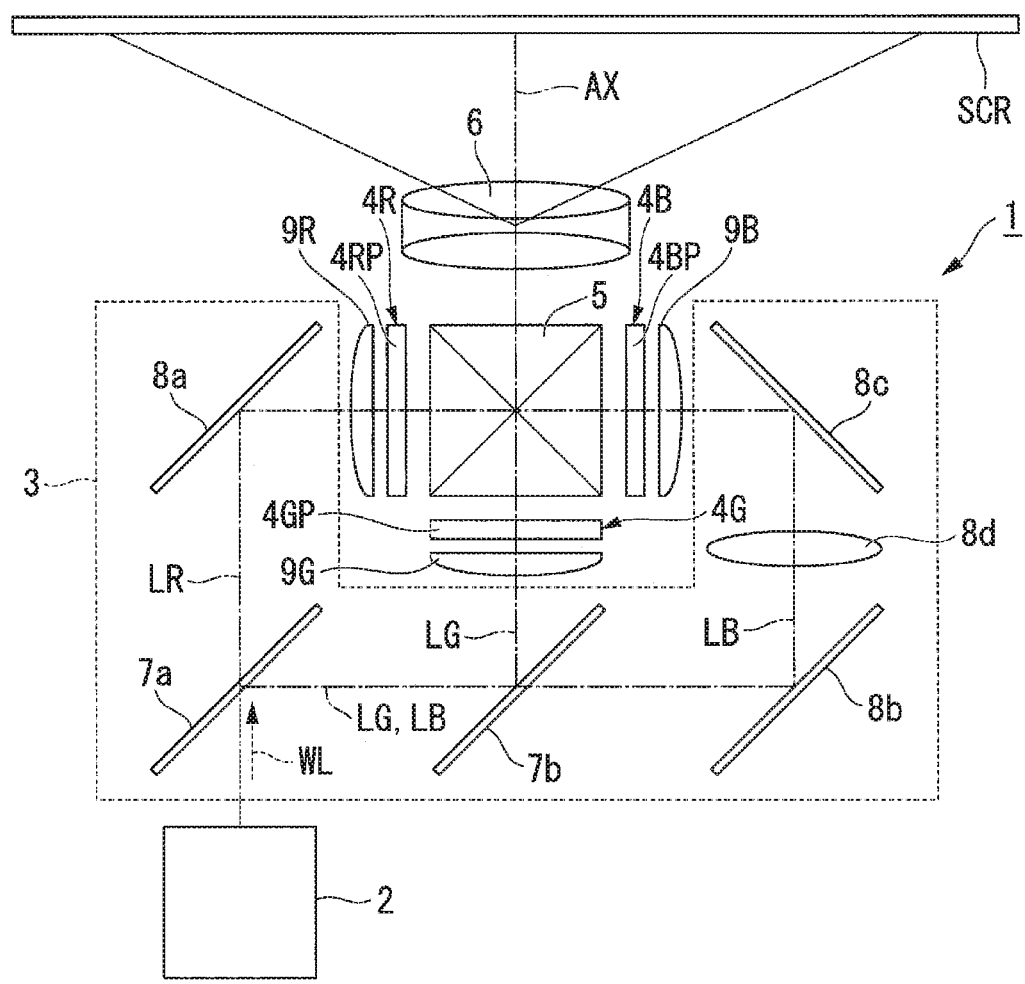
FIG. 1 is a schematic configuration diagram showing a projector according to a first embodiment.
Figure 2:
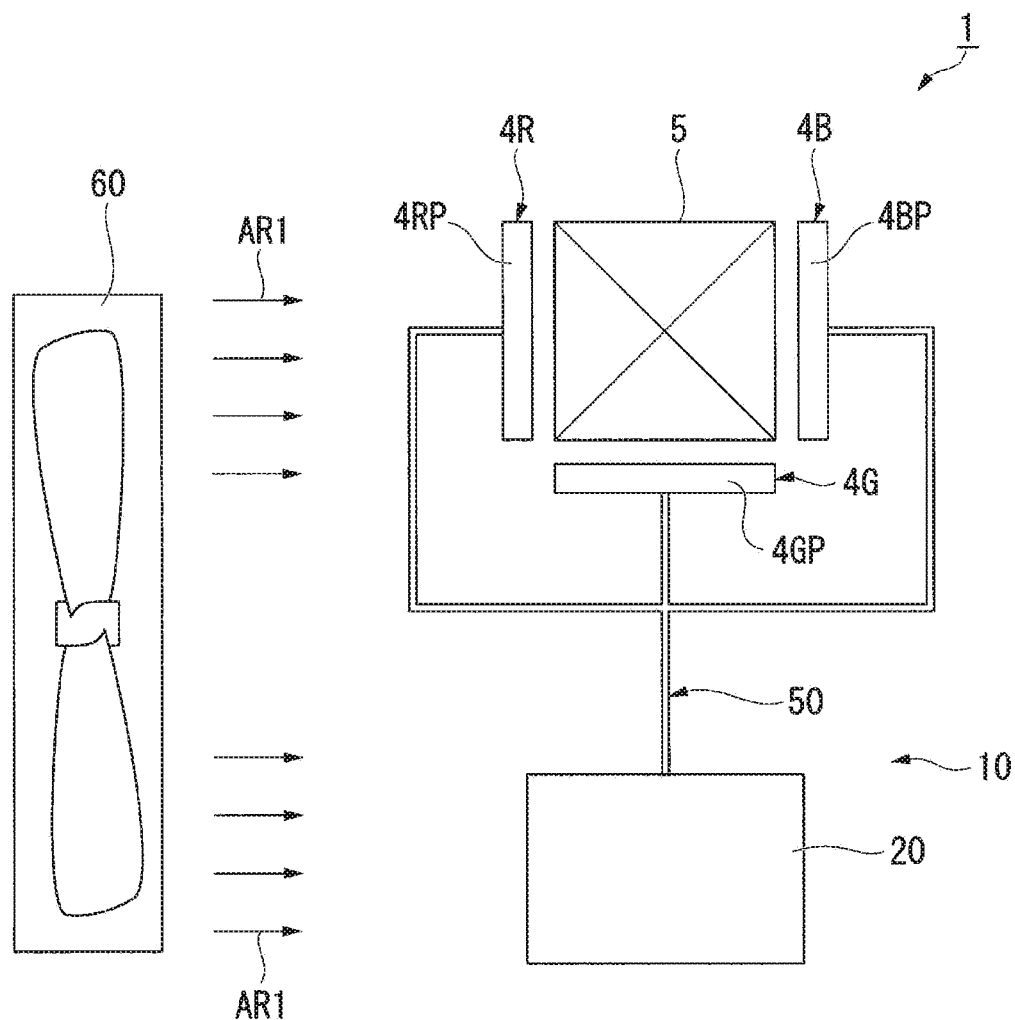
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source 2, a color separation system 3, a light modulation unit 4R, a light modulation unit 4G, a light modulation unit 4B, a light combining system 5, and a projection optical apparatus 6, as shown in FIG. 1. The light modulation unit 4R includes a light modulator 4RP. The light modulation unit 4G includes a light modulator 4GP. The light modulation unit 4B includes a light modulator 4BP.

The light source 2 outputs illumination light WL, which is adjusted to have a substantially uniform illuminance distribution, toward the color separation system 3. The light source 2 is, for example, a semiconductor laser. The color separation system 3 separates the illumination light WL from the light source 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source 2 into the red light LR and light containing the green light LG and the blue light mixed with each other. The first dichroic mirror 7a is so characterized as to transmit the red light LR and reflect the green light LG and the blue light LB. The second dichroic mirror 7b separates the light containing the green light LG and the blue light LB mixed with each other into the green light LG and the blue light LB. The second dichroic mirror 7b is so characterized as to reflect the green light LG and transmit the blue light LB.

The first reflection mirror 8a is disposed in the optical path of the red light LR and reflects the red light LR having passed through the first dichroic mirror 7a toward the light modulator 4RP. The second reflection mirror 8b and the third reflection mirror 8c are disposed in the optical path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light outputted from the light source 2 in accordance with an image signal. The light modulator 4GP modulates the green light LG out of the light outputted from the light source 2 in accordance with an image signal. The light modulator 4BP modulates the blue light LB out of the light outputted from the light source 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a substantially cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a projection lens group. The projection optical apparatus 6 enlarges the combined image light from the light combining system 5, that is, the light fluxes modulated by the light modulators 4RP, 4GP, and 4BP and projects the enlarged image light, that is, the enlarged modulated light fluxes toward a screen SCR. An enlarged color image (video) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, water in the liquid form. In the following description, the transformation of the refrigerant W into a gas is therefore simply called vaporization in some cases. In the present embodiment, the cooling target includes the light modulation units 4R, 4G, and 4B. That is, in the present embodiment, the cooling target includes the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target, that is, the light modulation units 4R, 4G, and 4B in the present embodiment vaporizes so as to be capable of drawing heat from the cooling target. The cooler 10 can thus cool the cooling target. The refrigerant generator 20 and the refrigerant sender 50 will be described below in detail.

Figure 3:
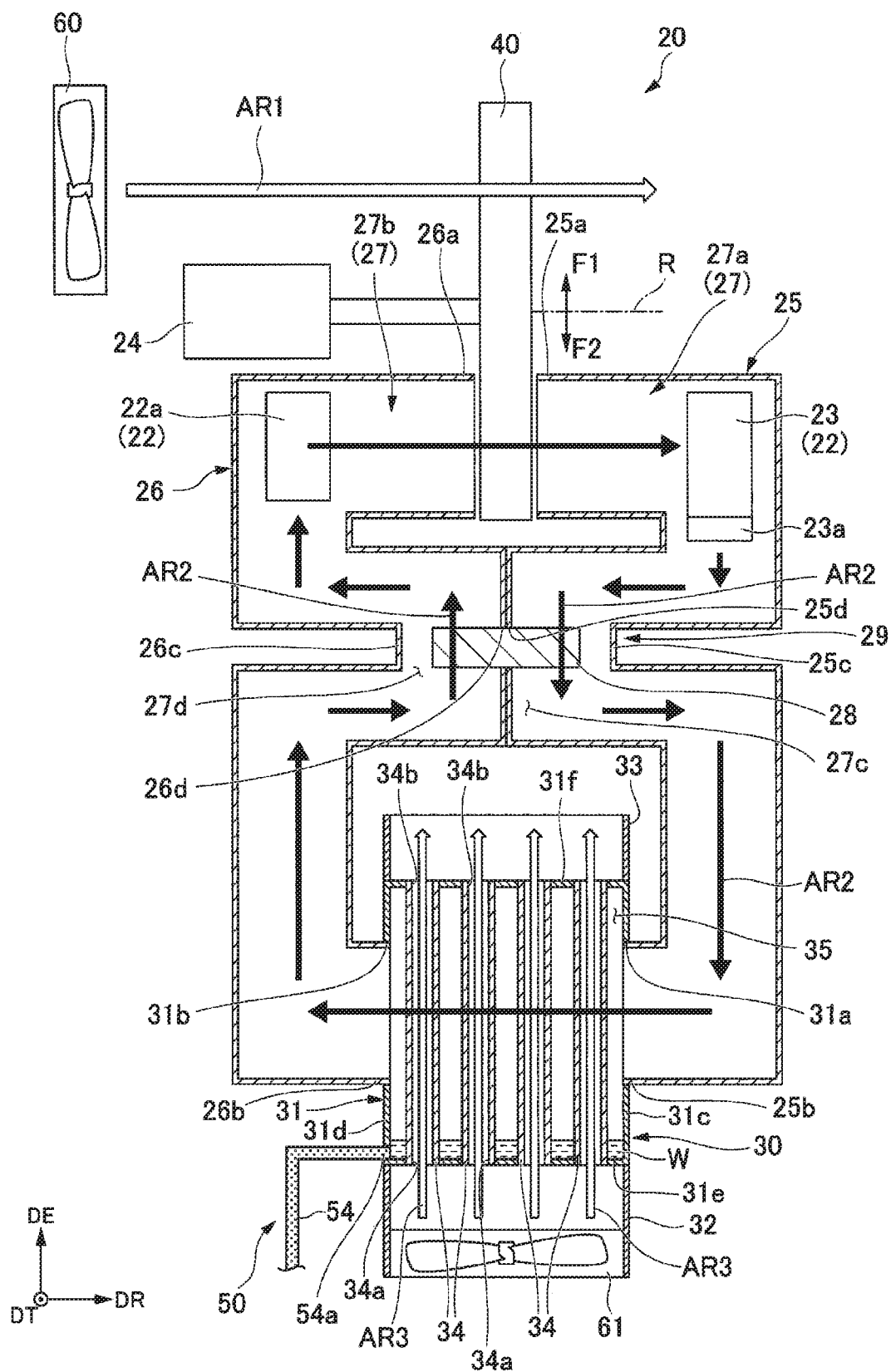
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor (driver) 24, a first blower (cooling blower) 60, a first heat exchanger 30, a first duct 25, a second duct 26, a heater 22, a second blower 23, a third blower 61, and a second heat exchanger 29, as shown in FIG. 3.

Figure 4:
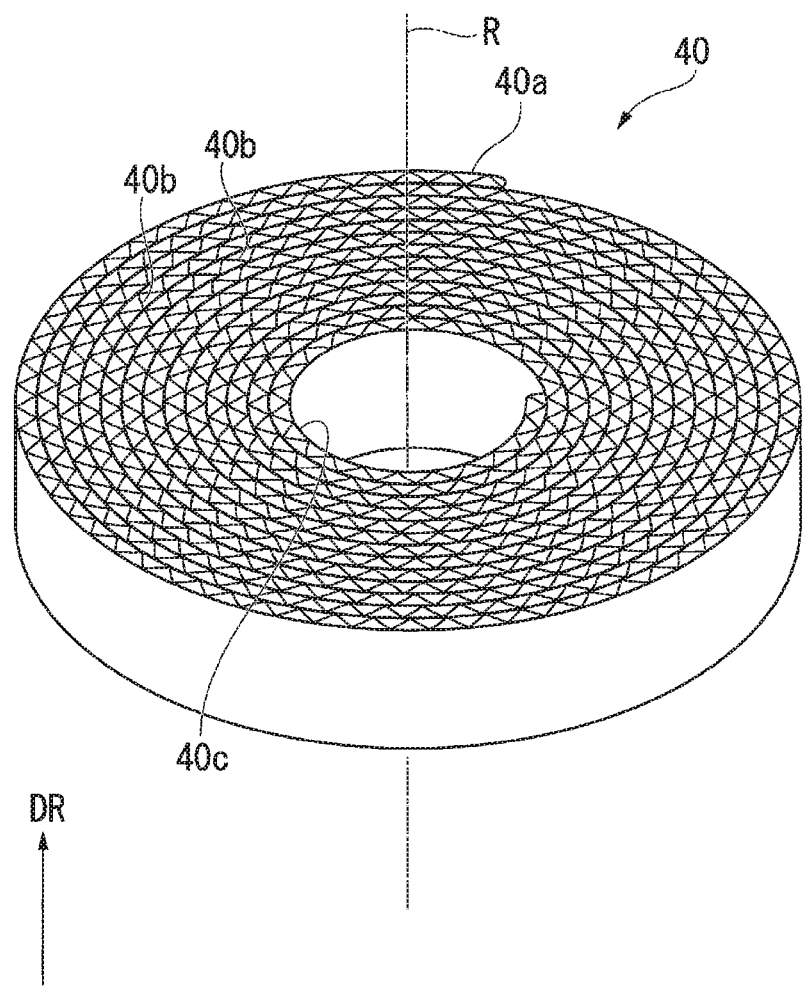
FIG. 4 is a perspective view showing a moisture absorbing/discharging member in the first embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR in the drawings.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. A surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. Examples of the substance that absorbs and discharges moisture may include zeolite and silica gel.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 0.2 rpm but smaller than or equal to 5 rpm.

The first blower 60 is, for example, an intake fan that takes the air in the ambient environment into the projector 1. The first blower 60 delivers air AR1 to a portion of the moisture absorbing/discharging member 40 that is the portion located in a first region F1. The first region F1 is a region on one side of the axis of rotation R in the direction perpendicular to the axis of rotation R. On the other hand, the region on the other side of the axis of rotation R in the direction perpendicular to the axis of rotation R, that is, the region opposite the first region F1 with respect to the axis of rotation R is a second region F2. The first region F1 is a region above the axis of rotation R in FIG. 3. The second region F2 is a region below the axis of rotation R in FIG. 3.

The first blower 60 delivers the air AR1 also to the light modulation units 4R, 4G, and 4B, which form the cooling target, as shown in FIG. 2. That is, in the present embodiment, the first blower 60 is a cooling blower that delivers the air AR1 to the cooling target. The first blower 60 is not limited to a specific apparatus and may be any apparatus capable of delivering the air AR1, for example, an axial fan and a centrifugal fan.

Figure 5:
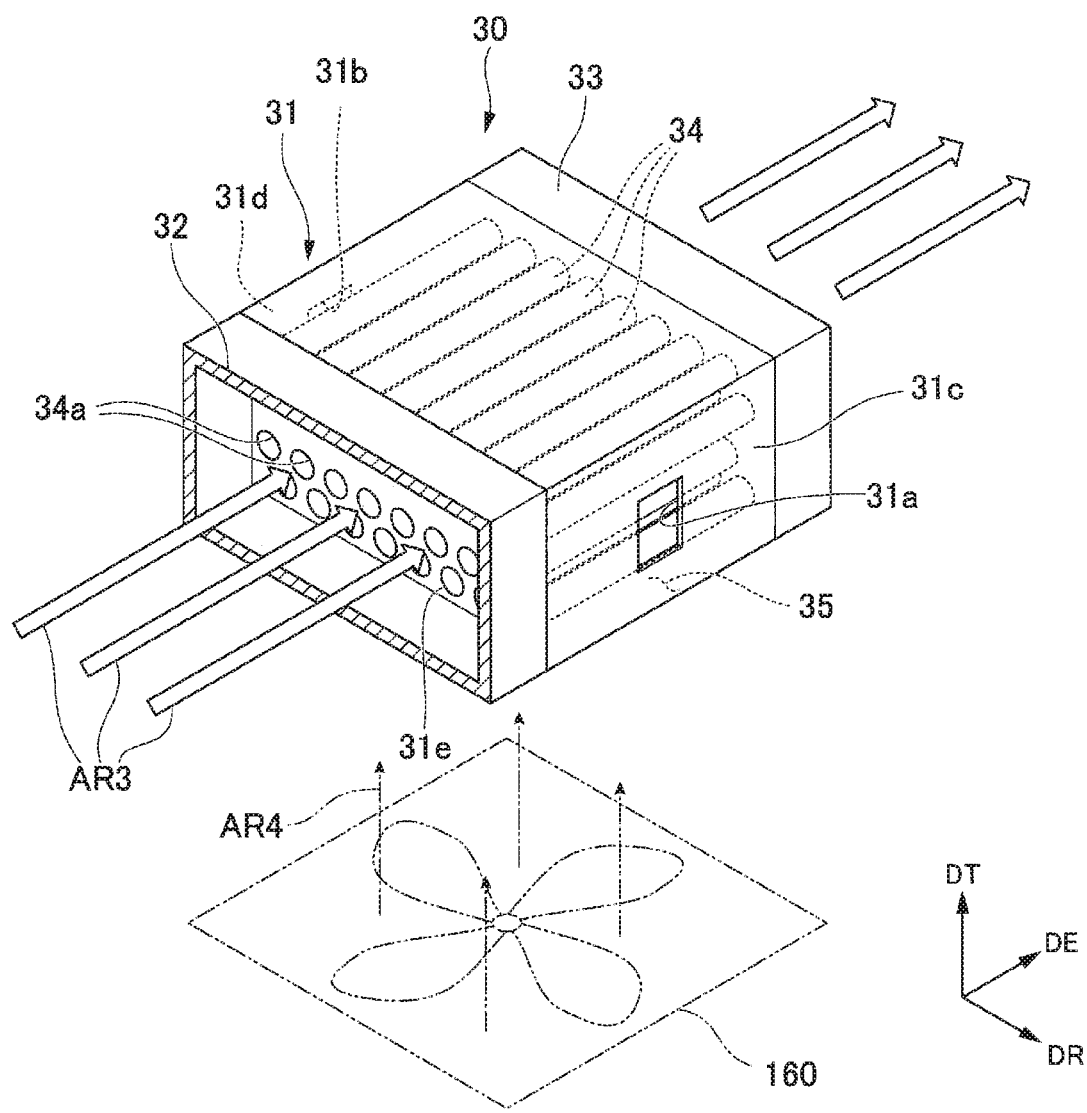
FIG. 5 is a partial cross-sectional perspective view showing a first heat exchanger in the first embodiment.

The first heat exchanger 30 is a portion that generates the refrigerant W. FIG. 5 is a partial cross-sectional perspective view showing the first heat exchanger 30. The first heat exchanger 30 includes an enclosure 31, a plurality of channels 34, a flow-in duct 32, and a flow-out duct 33, as shown in FIG. 5.

In the present embodiment, the enclosure 31 has the shape of a rectangular parallelepiped box. The enclosure 31 includes an internal space 35, a flow-in hole 31a, and a flow-out hole 31b. Air delivered by the second blower 23 flows into the internal space 35. The flow-in hole 31a is provided in a side wall 31c of the enclosure 31 that is a sidewall on one side in the rotational axis direction DR (+DR side). The flow-out hole 31b is provided in a side wall 31d of the enclosure 31 that is a sidewall on the other side in the rotational axis direction DR (−DR side). The flow-in hole 31a and the flow-out hole 31b communicate with the internal space 35. The flow-in hole 31a and the flow-out hole 31b each have, for example, a rectangular shape. In the present embodiment, the flow-in hole 31a and the flow-out hole 31b coincide with each other when viewed along the rotational axis direction DR.

The plurality of channels 34 are disposed in the internal space 35. Air delivered by the third blower 61, which will be described later, flows through the interior of the plurality of channels 34. In the present embodiment, the plurality of channels 34 are each a linearly extending conduit. The channels 34 each have, for example, a cylindrical shape. The channels 34 are each open at the opposite ends thereof in the direction in which the channel 34 extends. The plurality of channels 34 extend, for example, in parallel to one another. The direction in which the channels 34 extend is, for example, perpendicular to the rotational axis direction DR. In the following description, the direction in which the channels 34 extend is called an "extension direction DE" and drawn as appropriate in the form of an axis DE in the drawings. The first region F1 and the second region F2 described above are separate with respect to the axis of rotation R from each other in the extension direction DE perpendicular to the rotational axis direction DR.

In the present specification, the case where "a plurality of channels extend in parallel to one another" includes both a case where the plurality of channels extend in exactly parallel to one another and a case where the plurality of channels extend in substantially parallel to one another. The case where "the plurality of channels extend in substantially parallel to one another" includes, for example, a case where the angle between the channels falls within a range smaller than or equal to about 10°.

In the present embodiment, the channels 34 are formed by layering a plurality of rows, which are each formed of a plurality of the channels 34 arranged in the rotational axis direction DR, on each other in the direction perpendicular both to the rotational axis direction DR and the extension direction DE. The direction perpendicular both to the rotational axis direction DR and the extension direction DE is called a "thickness direction DT" and drawn as appropriate in the form of an axis DT in the drawings. The plurality of channels 34 form, for example, for rows arranged in the thickness direction DT. The channels 34 provided in one of the rows adjacent to each other in the thickness direction DT are located between in the rotational axis direction DR the channels 34 provided in the other row. That is, the plurality of channels 34 are arranged in a zigzag pattern when viewed along the extension direction DE.

The channels 34 extend from a sidewall 31e of the enclosure 31 that is the sidewall on the other side in the extension direction DE (−DE side) to a sidewall 31f of the enclosure 31 that is the sidewall on the one side in the extension direction DE (+DE side), as shown in FIG. 3. An end of each of the channels 34 that is the end on the other side in the extension direction DE (−DE side) is a flow-in port 34a, which is open via a surface of the sidewall 31e that is the surface on the other side in the extension direction DE to the ambient environment outside the enclosure 31. An end of each of the channels 34 that is the end on the one side in the extension direction DE (+DE side) is a flow-out port 34b, which is open via a surface of the sidewall 31f that is the surface on the one side in the extension direction DE to the ambient environment outside the enclosure 31. The channels 34 thus cause the spaces located on opposite sides of the enclosure 31 in the extension direction DE to communicate with each other. On the other hand, the interior of the plurality of channels 34 does not communicate with the internal space 35. The air flowing through the interior of the plurality of channels 34 is not mixed with the air having flowed into the internal space 35. That is, the interior of the plurality of channels 34 is isolated with the internal space 35.

The flow-in duct 32 and the flow-out duct 33 are each a duct extending in the extension direction DE. In the present embodiment, the flow-in duct 32 and the flow-out duct 33 each have a rectangular tubular shape. The flow-in duct 32 and the flow-out duct 33 are so disposed as to sandwich the enclosure 31 in the extension direction DE and each coupled to the enclosure 31. The flow-in duct 32 is located on a side of the enclosure 31 that is the other side in the extension direction DE (−DE side). The flow-out duct 33 is located on a side of the enclosure 31 that is the one side in the extension direction DE (+DE side).

An end of the flow-in duct 32 that is the end on the one side in the extension direction DE (+DE side) is fixed to an outer circumferential portion of the sidewall 31e and closed by the sidewall 31e. The flow-in ports 34a of the plurality of channels 34 are open to the interior of the flow-in duct 32. The interior of the flow-in duct 32 thus communicates with the interior of the plurality of channels 34 via the flow-in ports 34a.

An end of the flow-out duct 33 that is the end on the other side in the extension direction DE (−DE side) is fixed to an outer circumferential portion of the sidewall 31f and closed by the sidewall 31f. The flow-out ports 34b of the plurality of channels 34 are open to the interior of the flow-out duct 33. The interior of the flow-out duct 33 thus communicates with the interior of the plurality of channels 34 via the flow-out ports 34b.

In the present embodiment, the first duct 25 and the second duct 26 are arranged in the rotational axis direction DR and sandwich the moisture absorbing/discharging member 40 and the first heat exchanger 30 in the rotational axis direction DR. In the present embodiment, the first duct 25 and the second duct 26 each extend as a whole in the extension direction DE. The first duct 25 and the second duct 26 have shapes, for example, symmetric in the rotational axis direction DR. The first duct 25 and the second duct 26 are made, for example, of resin.

The first duct 25 is a duct disposed on one side of the moisture absorbing/discharging member 40 in the rotational axis direction DR (+DR side). The first duct 25 extends from a side of the moisture absorbing/discharging member 40 that is the one side in the rotational axis direction DR to a side of the enclosure 31 that is the one side in the rotational axis direction DR. An end 25a of the first duct 25 that is the end on the one side in the extension direction DE (+DE side) is open on the other side in the rotational axis direction DR (−DR side) toward a portion of the moisture absorbing/discharging member 40 that is the portion located in the second region F2. An end 25b of the first duct 25 that is the end on the other side in the extension direction DE (−DE side) is coupled to the flow-in hole 31a of the enclosure 31 and is open to the internal space 35. The interior of the first duct 25 thus communicates with the internal space 35.

In the present embodiment, the first duct 25 includes a first overhang (first contact section) 25c, which overhangs toward the second duct 26. The first overhang 25c is, for example, a portion of the first duct that is a central portion in the extension direction DE. In the present embodiment, the first overhang 25c overhangs toward the other side in the rotational axis direction DR (−DR side) in such a way that portions of the first duct 25 that are portions on the opposite sides of the first overhang 25c in the extension direction DE are bent at right angles with respect to the extension direction DE. The first overhang 25c extends in the extension direction DE. The first overhang 25c is a portion on the downstream of a portion of the first duct 25 in the direction in which the air flows in the first duct 25 that is the portion where the second blower 23 is disposed.

A through hole 25d is formed in a wall of the first overhang 25c that is the wall on the other side in the rotational axis direction DR (−DR side). A wall of the first overhang 25c that is the wall on the other side in the rotational axis direction DR is the wall facing the second duct 26 in the rotational axis direction DR.

The second duct 26 is a duct disposed on the other side of the moisture absorbing/discharging member 40 in the rotational axis direction DR (−DR side). The second duct 26 extends from a side of the moisture absorbing/discharging member 40 that is the other side in the rotational axis direction DR to a side of the enclosure 31 that is the other side in the rotational axis direction DR. An end 26a of the second duct 26 that is the end on the one side in the extension direction DE (+DE side) is open on the one side in the rotational axis direction DR (+DR side) toward a portion of the moisture absorbing/discharging member 40 that is the portion located in the second region F2. An end 26b of the second duct 26 that is the end on the other side in the extension direction DE (−DE side) is coupled to the flow-out hole 31b of the enclosure 31 and is open to the internal space 35. The interior of the second duct 26 thus communicates with the internal space 35.

In the present embodiment, the second duct 26 includes a second overhang (second contact section) 26c, which overhangs toward the first duct 25. In the present embodiment, the second overhang 26c overhangs toward the one side in the rotational axis direction DR (+DR side) in such a way that portions of the second duct 26 that are portions on the opposite sides of the second overhang 26c in the extension direction DE are bent at right angles with respect to the extension direction DE. The second overhang 26c extends in the extension direction DE. The second overhang 26c is a portion on the upstream of a portion of the second duct 26 in the direction in which the air flows in the second duct 26 that is the portion where a heating main body 22a, which will be described later, of the heater 22 is disposed.

A through hole 26d is formed in a wall of the second overhang 26c that is the wall on the one side in the rotational axis direction DR (+DR side). A wall of the second overhang 26c that is the wall on the one side in the rotational axis direction DR is the wall facing the first duct 25 in the rotational axis direction DR. The through hole 26d is so disposed as to face the through hole 25d of the first overhang 25c.

In the present embodiment, the first overhang 25c and the second overhang 26c are in contact with each other. That is, in the present embodiment, the first overhang 25c corresponds to a section of the first duct 25 that is the first contact section that is in contact with the second duct 26, and the second overhang 26c corresponds to a section of the second duct 26 that is the second contact section that is in contact with the first contact section.

The heater 22 includes a heating main body 22a. The heating main body 22a is disposed in the second duct 26. The heating main body 22a is disposed on a side of a portion of the moisture absorbing/discharging member 40 that is the portion located in the second region F2 that is the side on the other side in the rotational axis direction DR (−DR side). The heating main body 22a is, for example, an electric heater. The heating main body 22a heats the atmosphere (air) in the second duct 26. In the present embodiment, the heater 22 includes the second blower 23.

The second blower 23 is disposed in the first duct 25. The second blower 23 is disposed on a side of a portion of the moisture absorbing/discharging member 40 that is the portion located in the second region F2 that is the side on the one side in the rotational axis direction DR (+DR side). The second blower 23 is, for example, a centrifugal fan. The second blower 23 exhausts the air sucked from the other side in the rotational axis direction DR (−DR side) via an exhaust port 23a to the other side in the extension direction DE (−DE side). The air exhausted via the exhaust port 23a flows into the internal space 35 of the enclosure 31 via the flow-in hole 31a. That is, the second blower 23 delivers air to the internal space 35 via the flow-in hole 31a. The second blower 23 may, for example, be an axial fan.

The air exhausted from the second blower 23 into the internal space 35 is the air having been sucked from a side of the second blower 23 that is the other side in the rotational axis direction DR (−DR side) via the end 25a of the first duct 25 and having passed through a portion of the moisture absorbing/discharging member 40 that is the portion located in the second region F2. That is, the second blower 23 causes the air to pass through a portion of the moisture absorbing/discharging member 40 that is the portion located in the second region F2 different from the first region F1 and delivers the air to the first heat exchanger 30. In the present embodiment, the air before passing through a portion of the moisture absorbing/discharging member 40 that is the portion located in the second region F2 has flowed through the interior of the second duct 26. The heating main body 22a therefore heats the air before passing through a portion of the moisture absorbing/discharging member 40 that is the portion located in the second region F2.

As described above, in the present embodiment, the heater 22 heats a portion of the moisture absorbing/discharging member 40 that is the portion located in the second region F2 by delivering the air heated by the heating main body 22a via the second blower 23 to a portion of the moisture absorbing/discharging member 40 that is the portion located in the second region F2. The second blower 23 thus delivers the air around a portion of the moisture absorbing/discharging member 40 that is the portion heated by the heater 22 to the first heat exchanger 30.

The air having flowed from the second blower 23 into the internal space 35 of the first heat exchanger 30 passes through the internal space 35 in the rotational axis direction DR and flows into the second duct 26 via the flow-out hole 31b. The air having flowed into the second duct 26 is heated by the heating main body 22a, passes through a portion of the moisture absorbing/discharging member 40 that is the portion located in the second region F2 again, flows into the first duct 25, and is sucked by the second blower 23.

As described above, in the present embodiment, the refrigerant generator 20 has a circulation path 27, along which the air exhausted from the second blower 23 circulates. The circulation path 27 is formed of at least the first duct 25, the second duct 26, and the first heat exchanger 30. The circulation path 27 passes through the heating main body 22a, the moisture absorbing/discharging member 40, and the internal space 35. The circulation path 27 is substantially sealed although small gaps are provided between the moisture absorbing/discharging member 40 and the first duct 25 and between the moisture absorbing/discharging member 40 and the second duct 26 and entry of air outside the circulation path 27 into the circulation path 27 is therefore suppressed. In the following description, the air exhausted from the second blower 23 and circulating along the circulation path 27 is called air AR2.

The circulation path 27 includes a first path 27a and a second path 27b. The first path 27a is a path along which the air AR2 having passed through a portion of the moisture absorbing/discharging member 40 that is the portion located in the second region F2 flows into the first heat exchanger 30. In the present embodiment, the first path 27a is formed of the first duct 25. That is, in the present embodiment, the second blower 23 is disposed in the first path 27a. The second path 27b is a path along which the air AR2 exhausted from the first heat exchanger 30 is delivered to a portion of the moisture absorbing/discharging member 40 that is the portion located in the second region F2. In the present embodiment, the second path 27b is formed of the second duct 26. That is, in the present embodiment, the heating main body 22a is disposed in the second path 27b. The heating main body 22a thus heats the air AR2 flowing along the second path 27b.

The first path 27a includes a first proximity section 27c. The first proximity section 27c is a portion of the first path 27a that is a portion so disposed as to be closer to the second path 27b than the other portions of the first path 27a. In the present embodiment, the first proximity section 27c is formed of the first overhang 25c. The first proximity section 27c is a portion on the downstream of a portion of the first path 27a in the direction in which the air AR2 flows along the first path 27a that is the portion where the second blower 23 is disposed. The air AR2 flows through the first proximity section 27c from the one side in the extension direction DE (+DE side) to the other side in the extension direction DE (−DE side).

The second path 27b includes a second proximity section 27d. The second proximity section 27d is a portion of the second path 27b that is a portion so disposed as to be closer to the first path 27a than the other portions of the second path 27b. In the present embodiment, the second proximity section 27d is formed of the second overhang 26c. The second proximity section 27d is a portion on the upstream of a portion of the second path 27b in the direction in which the air AR2 flows along the second path 27b that is the portion where the heating main body 22a is disposed. The air AR2 flows through the second proximity section 27d from the other side in the extension direction DE (−DE side) to the one side in the extension direction DE (+DE side). That is, the direction in which the air AR2 flows through the first proximity section 27c is opposite the direction in which the air AR2 flows through the second proximity section 27d. In other words, the direction in which the air AR2 flows through the first overhang 25c is opposite the direction in which the air AR2 flows through the second overhang 26c. The first proximity section 27c and the second proximity section 27d are so disposed as to be adjacent to each other in the rotational axis direction DR.

In the present embodiment, the third blower 61 is disposed in the flow-in duct 32. The third blower 61 may be an axial fan or a centrifugal fan. The third blower 61 exhausts cooling air AR3 through the flow-in duct 32 toward the one side in the extension direction DE (+DE side). The exhausted cooling air AR3 flows into the channels 34 via the flow-in ports 34a. That is, in the present embodiment, the third blower 61 delivers the cooling air AR3 through the flow-in duct 32 into the plurality of channels 34 via the flow-in ports 34a. The cooling air AR3 thus flows into the plurality of channels 34. The cooling air AR3 passing through the interior of the channels 34 cools the air AR2 in the internal space 35 via the channels 34. The third blower 61, which delivers the cooling air AR3 into the channels 34, can thus cool via the channels 34 the air AR2 flowing into the internal space 35. The cooling air AR3 delivered into the channels 34 flows out via the flow-out ports 34b into the flow-out duct 33.

Figure 6:
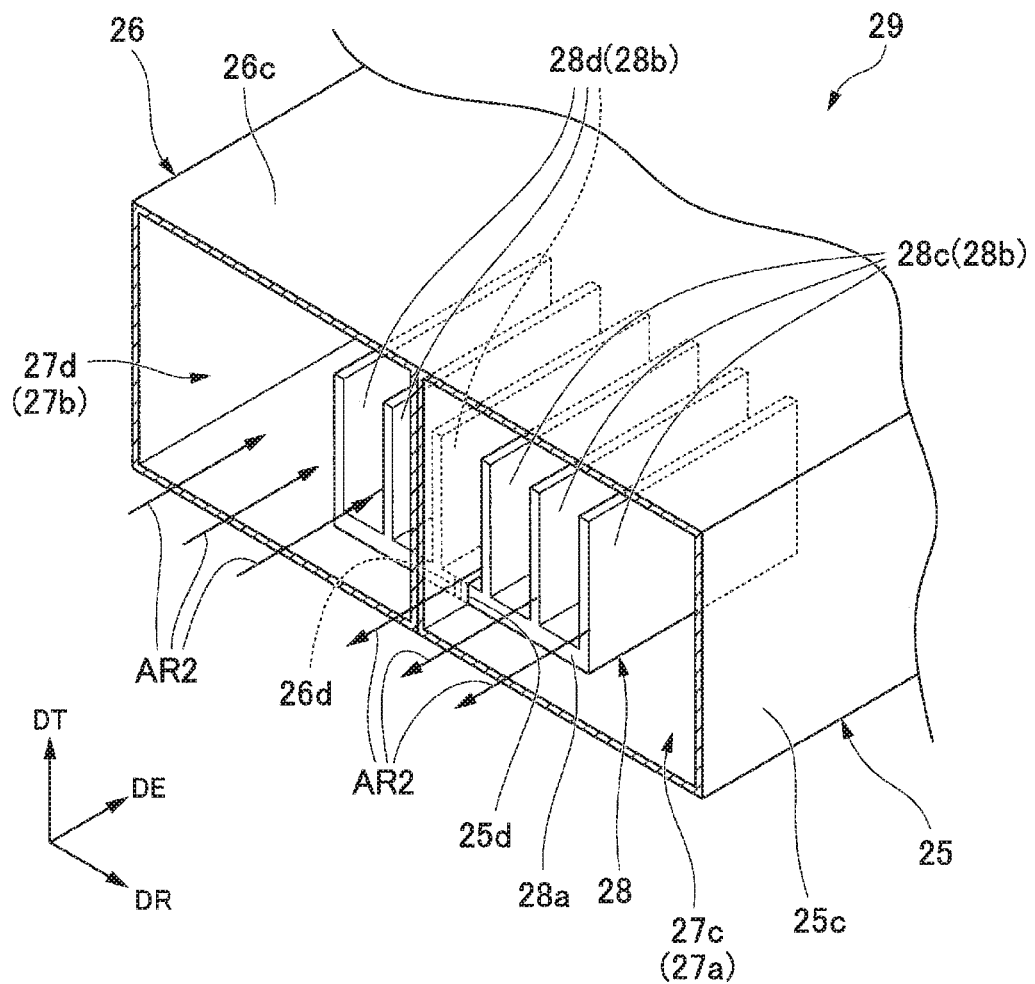
FIG. 6 is a partial cross-sectional perspective view showing part of a second heat exchanger in the first embodiment.

The second heat exchanger 29 is provided in the circulation path 27. The second heat exchanger 29 exchanges heat between the air AR2 flowing along the first path 27a and the air AR2 flowing along the second path 27b. FIG. 6 is a partial cross-sectional perspective view showing part of the second heat exchanger 29. In the present embodiment, the second heat exchanger 29 includes the first proximity section 27c formed of the first overhang 25c, the second proximity section 27d formed of the second overhang 26c, and a heat transfer member 28, as shown in FIG. 6.

In the present embodiment, the heat transfer member 28 is so disposed as to extend over the first proximity section 27c of the first path 27a and second proximity section 27d of the second path 27b. The heat transfer member 28 is, for example, a heat sink. The heat transfer member 28 includes a base 28a and a plurality of fins 28b, which protrude from the base 28a in the same direction. In the present embodiment, the base 28a has the shape of a rectangular plate having plate surfaces oriented in the thickness direction DT. The base 28a passes through the through holes 25d and 26d and extends over the first proximity section 27c and the second proximity section 27d. Although not shown, for example, a filling member that fills the gap between the base 28a and the inner circumferential surfaces of the through holes 25d and 26d is provided between the base 28a and the inner circumferential surfaces of the through holes 25d and 26d. The movement of the air AR2 between the first path 27a and the second path 27b via the through holes 25d and 26d can thus be suppressed.

The plurality of fins 28b protrude from the base 28a toward one side in the thickness direction DT (+DT side). The plurality of fins 28b each have the shape of a rectangular plate having plate surfaces oriented in the rotational axis direction DR. The plurality of fins 28b are arranged at equal intervals in the rotational axis direction DR. The fins 28b are formed, for example, of six fins. Out of the six fins 28b, three fins 28b located on the one side in the rotational axis direction DR (+DR side) are first fins 28c disposed in the first proximity section 27c. Out of the six fins 28b, three fins 28b located on the other side in the rotational axis direction DR (−DR side) are second fins 28c disposed in the second proximity section 27d. That is, in the present embodiment, part of the plurality of fins 28b are disposed in the first path 27a, and the remainder of the plurality of fins 28b are disposed in the second path 27b.

The air AR2 flowing along the first path 27a has been heated by the heater 22 and therefore tends to have a temperature higher than that of the air AR2 exhausted from the first heat exchanger 30 and flowing along the second path 27b. The heat of the air AR2 flowing along the first path 27a is therefore transferred by the heat transfer member 28 to the air AR2 flowing along the second path 27b. In more detail, the plurality of first fins 28c disposed in the first path 27a absorb the heat from the air AR2 flowing along the first path 27a. The heat absorbed by the first fins 28c passes through the base 28a, moves to the plurality of second fins 28d, and is dissipated from the second fins 28d into the air AR2 flowing along the second path 27b. As described above, the second heat exchanger 29 in the present embodiment exchanges heat between the air AR2 flowing along the first path 27a and the air AR2 flowing along the second path 27b via the heat transfer member 28. In more detail, the second heat exchanger 29 in the present embodiment exchanges heat between the air AR2 flowing along the first path 27a and the air AR2 flowing along the second path 27b through the region on the upstream of the heating main body 22a.

When the air AR1 is delivered from the first blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 rotates the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 thus vaporizes and is discharged into the air AR2.

The air AR2 having passed through the moisture absorbing/discharging member 40 and therefore containing the water vapor absorbed from the air AR1 is delivered by the second blower 23 to the internal space 35 of the first heat exchanger 30. The air AR2 delivered to the internal space 35 and having a relatively high temperature flows through the internal space 35 in a direction that intersects the extension direction DE, in which the plurality of channels 34 extend, and is cooled by the cooling air AR3 flowing through the interior of the plurality of channels 34. The water vapor contained in the air AR2 thus condenses into water in the liquid form, that is, the refrigerant W. As described above, in the enclosure 31 of the first heat exchanger 30, that is, in the internal space 35, when the cooling air AR3 delivered into the plurality of channels 34 cools the air AR2 having flowed into the internal space 35, the refrigerant W is generated from the air AR2 having flowed into the internal space 35.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension.

Figure 7:
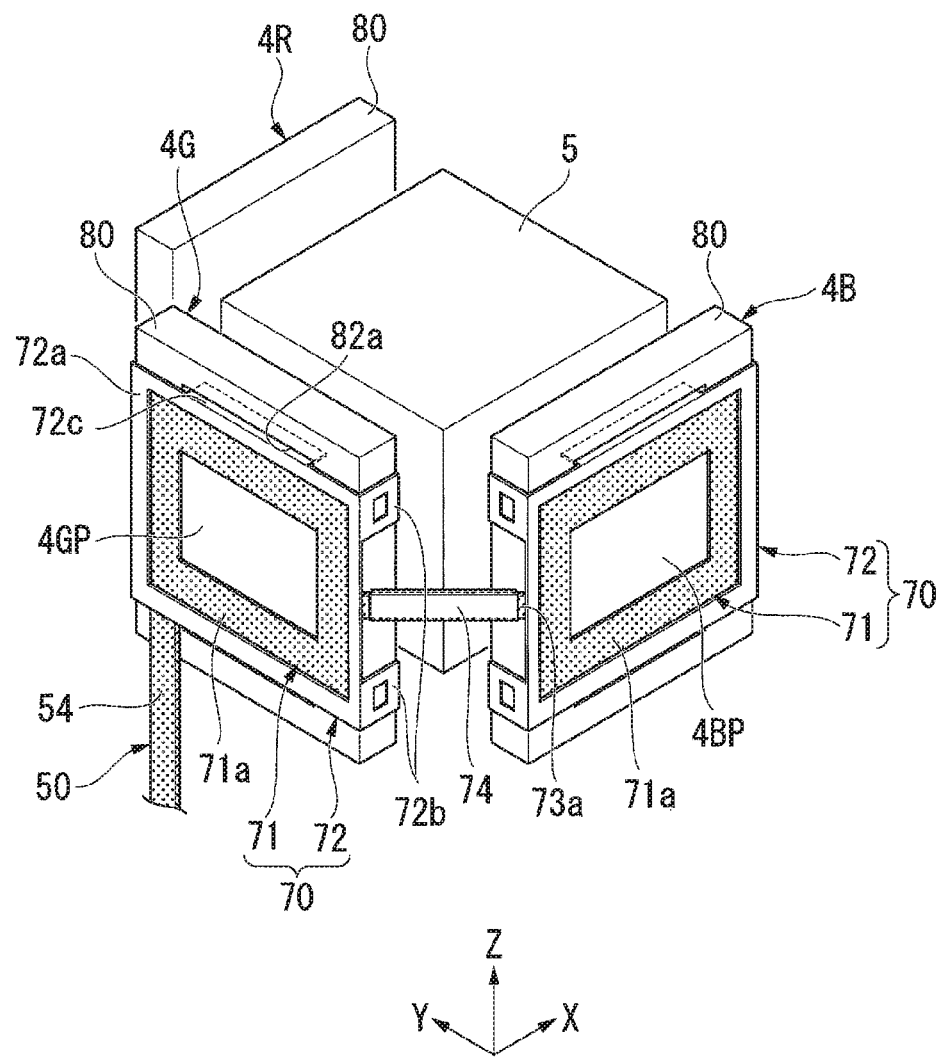
FIG. 7 is a perspective view showing light modulation units and a light combining system in the first embodiment.

The refrigerant sender 50 includes a connector 54 coupled to the enclosure 31. The connector 54 is a portion that couples the enclosure 31 to the cooling target. In the present embodiment, the refrigerant sender 50 is formed of a porous member as described above, and the connector 54 is therefore formed of a porous member. An end 54a of the connector 54 that is the end coupled to the enclosure 31 is exposed to the internal space 35. The connector 54 extends from the internal space 35 of the enclosure 31, passes through the sidewall 31d of the enclosure 31, and protrudes out of the enclosure 31. The connector 54 has the shape of a thin band. The connector 54, which protrudes out of the enclosure 31, extends to the light modulation unit 4G, which is part of the cooling target, as shown in FIG. 7. FIG. 7 is a perspective view showing the light modulation units 4R, 4G, and 4B and the light combining system 5.

The light modulation units 4R, 4G, and 4B, which form the cooling target in the present embodiment, will next be described in more detail. In the following description, an upward/downward direction Z, the upper side of which is the positive side and the lower side of which is the negative side, is drawn as appropriate in the form of an axis Z in the drawings. The direction parallel to an optical axis AX of a projection lens of the projection optical apparatus 6 that is the projection lens closest to the light exiting side, that is, the direction parallel to the projection direction of the projection optical apparatus 6 is called an "optical axis direction X" and drawn as appropriate in the form of an axis X in the drawings. The optical axis direction X is perpendicular to the upward/downward direction Z. The direction perpendicular both to the optical axis direction X and the upward/downward direction Z is called a "width direction Y" and drawn as appropriate in the form of an axis Y in the drawings.

The upward/downward direction Z and the upper and lower sides thereof are merely names for describing the relative positional relationship among the portions of the projector, and the actual arrangement and other factors of the portions may differ from the arrangement and other factors indicated by the names.

Figure 8:
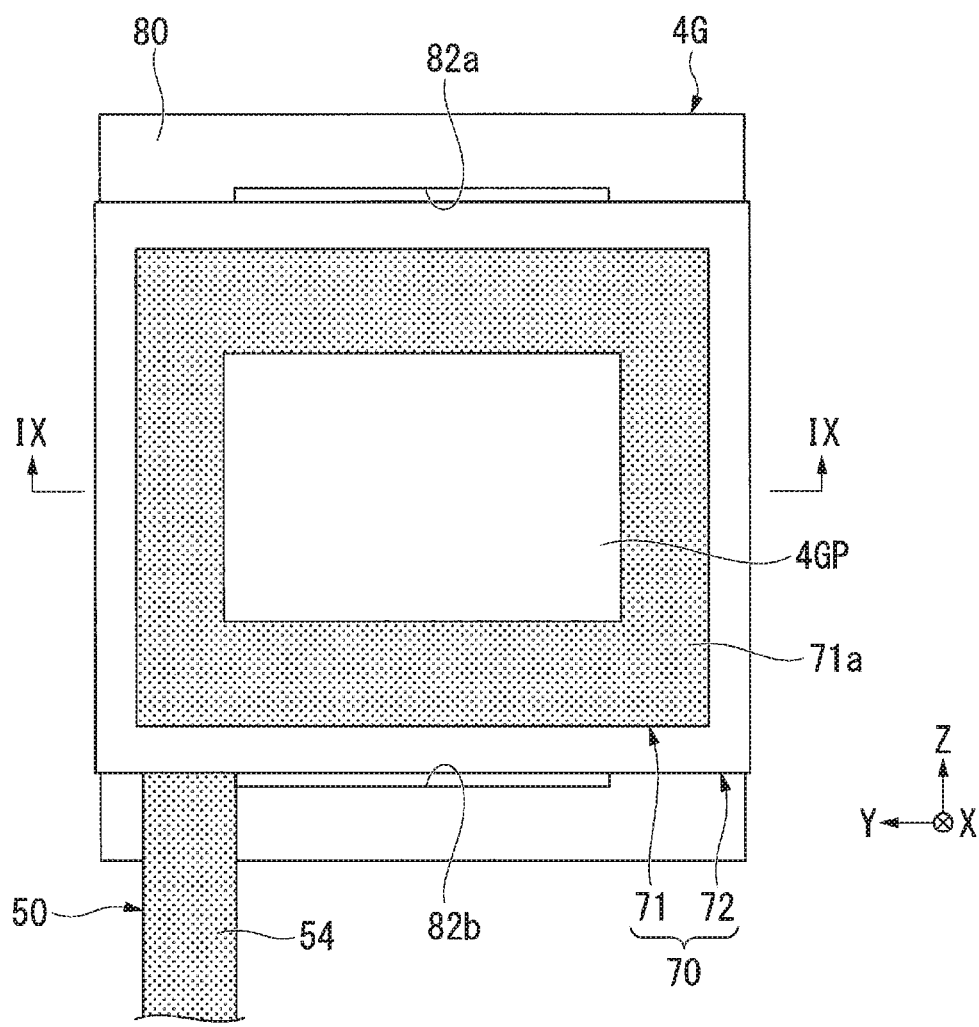
FIG. 8 shows one of the light modulation units in the first embodiment viewed from the light incident side.
Figure 9:
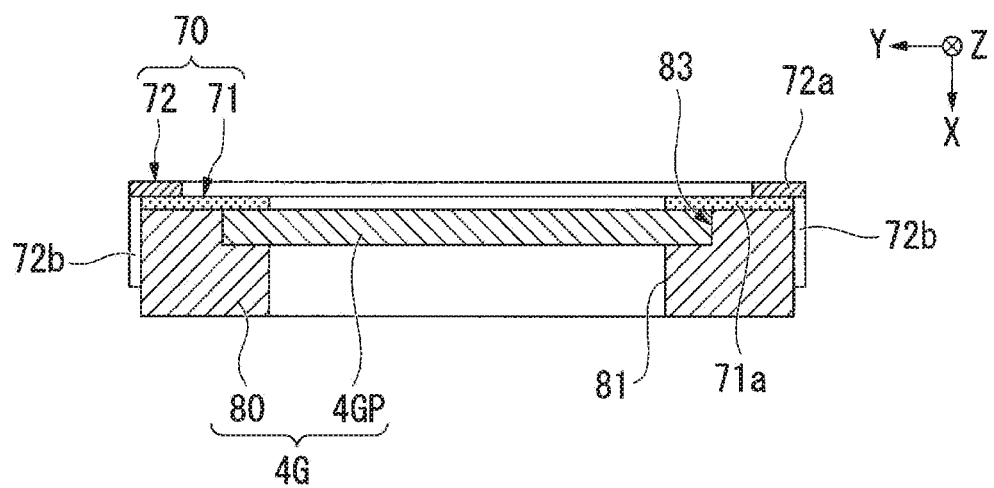
FIG. 9 is a cross-sectional view of the one light modulation unit in the first embodiment taken along the line IX-IX in FIG. 8.

FIG. 8 shows the light modulation unit 4G viewed from the light incident side. FIG. 9 is a cross-sectional view of the light modulation unit 4G taken along the line IX-IX in FIG. 8.

The light modulation units 4R, 4G, and 4B, which form the cooling target, are so disposed as to surround the light combining system 5, as shown in FIG. 7. The light modulation units 4R and 4B are so disposed on the opposite sides of the light combining system 5 as to sandwich the light combining system 5 in the width direction Y. The light modulation unit 4G is disposed on the light incident side of the light combining system 5 in the optical axis direction X (−X side). The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a substantially rectangular parallelepiped that is flat in the direction in which the light is incident on the light modulator 4GP and elongated in the upward/downward direction Z, as shown in FIGS. 7 to 9. The direction in which the light is incident on the light modulator 4GP is, for example, the optical axis direction X.

The holding frame 80 has a through hole 81, which passes through the holding frame 80 in the light incident direction, as shown in FIG. 9. A stepped part 83, where the through hole 81 widens, is provided along alight-incident-side (−X-side) edge of the through hole 81. The light modulator 4GP is so held by the holding frame 80 as to be fit in the stepped part 83. Insertion grooves 82a and 82b are formed in portions of the light-incident-side surface of the holding frame 80 that are portions on the opposite sides of the holding frame 80 in the upward/downward direction Z, as shown in FIG. 8.

The projector 1 further includes a cooling facilitator 70 provided in the light modulation unit 4G, which is part of the cooling target, as shown in FIGS. 7 to 9. The cooling facilitator 70 includes a refrigerant holder 71 and a fixing member 72. The refrigerant holder 71 is attached to a surface of the holding frame 80, which holds the light modulation unit 4G, which is part of the cooling target. In the present embodiment, the refrigerant holder 71 is provided on a surface of the holding frame 80 that is the surface on the light incident side of the light modulator 4GP (−X side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 10:
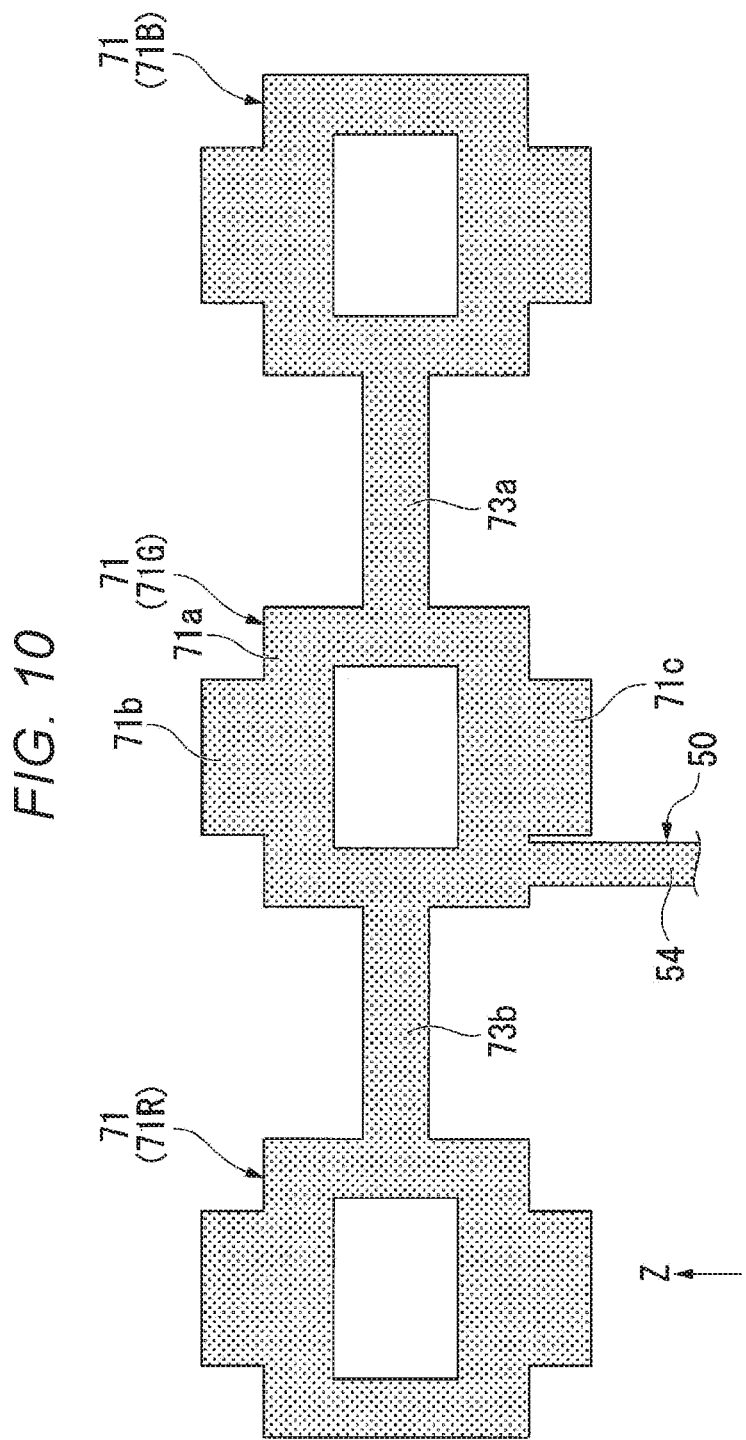
FIG. 10 shows refrigerant holders in the first embodiment.

FIG. 10 shows the refrigerant holder 71. The refrigerant holder 71 includes a main body part 71a, which has the shape of a rectangular frame, and insertion parts 71b and 71c, which are provided at the opposite ends of the main body part 71a in the upward/downward direction Z, as shown in FIG. 10. The main body part 71a covers part of a surface of the holding frame 80 that is the surface on the light incident side (−X side) of the light modulator 4GP, as shown in FIG. 9. An inner edge portion of the main body part 71a covers an outer edge portion of the light modulator 4GP. The insertion part 71b is bent and inserted into the insertion groove 82a of the holding frame 80. The insertion part 71c is bent and inserted into the insertion groove 82b of the holding frame 80.

The fixing member 72 is a member that fixes the refrigerant holder 71. The fixing member 72 is a plate-shaped member as shown in FIGS. 7 and 9. The fixing member 72 is made, for example, of metal. The fixing member 72 includes a frame part 72a, which has the shape of a rectangular frame, attachment parts 72b, and insertion parts 72c. The frame part 72a covers an outer edge portion of the refrigerant holder 71, as shown in FIGS. 8 and 9. The holding frame 80, the refrigerant holder 71, and the frame part 72a are layered on each other in the direction in which the light passes through the light modulator unit 4G (optical axis direction X). In the following description, the direction in which the holding frame 80, the refrigerant holder 71, and the frame part 72a are layered on each other is simply called a "layering direction." The fixing member 72 fixes the refrigerant holder 71 in such a way that the frame part 72a and the holding frame 80 sandwich the refrigerant holder 71 in the layering direction (optical axis direction X).

The inner edge of the frame part 72a is so provided as to be shifted outward from the inner edge of the refrigerant holder 71. A portion of the refrigerant holder 71, that is, the portion inside the frame part 72a in the present embodiment is exposed when viewed along the layering direction from the side facing the fixing member 72.

The attachment parts 72b are provided at four end portions of the frame part 72a, opposite end portions in the upward/downward direction Z and opposite end portions in the width direction Y, as shown in FIGS. 7 and 9. The attachment parts 72b protrude from the frame part 72a toward the holding frame 80 (+X side). The attachment parts 72b engage with protrusions provided on the side surface of the holding frame 80. The fixing member 72 is thus fixed to the holding frame 80.

The insertion parts 72c are provided at the opposite ends of the frame part 72a in the upward/downward direction Z. The insertion parts 72c protrude from the frame part 72a toward the holding frame 80 (+X side). The insertion parts 72c are inserted into the insertion grooves 82a and 82b of the holding frame 80. The insertion parts 72c press the insertion parts 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is coupled to the refrigerant sender 50, as shown in FIG. 10. In more detail, the connector 54 of the refrigerant sender 50 is coupled to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that the connector 54 is not coupled to the refrigerant holder 71B or the refrigerant holder 71R.

In the present embodiment, linkage parts 73a and 73b, which are each formed of a porous member, are provided and link the refrigerant holders 71R, 71G, and 71B, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage parts 73a and 73b, respectively.

The linkage part 73a links the refrigerant holder 71G attached to the light modulation unit 4G to the refrigerant holder 71B attached to the light modulation unit 4B. The refrigerant holder 71B is thus coupled to the connector 54 of the refrigerant sender 50 via the refrigerant holder 71G. The linkage part 73a is provided with a coating 74, which covers the linkage part 73a, as shown in FIG. 7. The coating 74 is, for example, a film made of resin.

The linkage part 73b links the refrigerant holder 71G attached to the light modulation unit 4G to the refrigerant holder 71R attached to the light modulation unit 4R. The refrigerant holder 71R is thus coupled to the connector 54 of the refrigerant sender 50 via the refrigerant holder 71G. Although not shown, the linkage part 73b is similarly provided with a coating 74, as is the linkage part 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage part 73a and to the refrigerant holder 71R via the linkage part 73b. The refrigerant W generated by the refrigerant generator 20 is thus sent to the three light modulation units 4R, 4G, and 4B. The refrigerant W sent to and held by the refrigerant holders 71R, 71G, and 71B then vaporizes to cool the light modulation units 4R, 4G, and 4B, which form the cooling target. In more detail, the refrigerant W held by the refrigerant holders 71R, 71G, and 71B vaporizes to cool the holding frames 80, to which the refrigerant holders 71R, 71G, and 71B are attached, so that the light modulators 4RP, 4GP, and 4BP held by the holding frames 80 are cooled. The cooler 10 can thus cool the light modulators 4RP, 4GP, and 4BP, which form the cooling target.

According to the present embodiment, the cooler 10 can cool the cooling target by sending the refrigerant W generated by the refrigerant generator 20 to the cooling target via the refrigerant sender 50 and using the vaporization of the refrigerant W, which is an endothermic reaction, to draw heat from the cooling target. The cooling based on the vaporization of the refrigerant W can actively draw heat from the cooling target and therefore provides excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise produced by the cooler 10. The projector 1 provided by the present embodiment therefore includes the cooler 10, which excels in cooling performance, has a compact size, and excels in quietness.

According to the present embodiment, in which the refrigerant generator 20 can generate the refrigerant W, a user's convenience can be improved because the user does not need to replenish the refrigerant W. Further, since the refrigerant generator 20 can perform adjustment in such a way that it generates the refrigerant W by a necessary amount as required, there is no need for storage of the refrigerant W, for example, in a storage tank, whereby the weight of the projector 1 can be reduced.

According to the present embodiment, the moisture absorbing/discharging member 40 can absorb water vapor contained in the air AR1 delivered from the first blower 60, and the moisture absorbed by the moisture absorbing/discharging member 40 can be discharged in the form of water vapor into the air AR2 delivered by the second blower 23. The first heat exchanger 30 then allows the moisture discharged in the form of water vapor into the air AR2 to condense into the refrigerant W. Therefore, according to the present embodiment, the refrigerant W can be generated from the atmosphere in the projector 1.

According to the present embodiment, the cooling air AR3, which cools the air AR2 in the internal space 35 of the enclosure 31 via the channels 34, flows into the plurality of channels 34 disposed in the internal space 35. The water vapor contained in the air AR2 is therefore allowed to condense in the internal space 35 into the refrigerant W. The air AR2 in the internal space 35 is cooled via surfaces of the plurality of channels 34 that are the surfaces exposed to the internal space 35. Therefore, for example, the larger the number of channels 34, the greater the surface area of the channels 34 exposed to the internal space 35. The air AR2 can therefore be readily cooled. The water vapor contained in the air AR2 is therefore readily caused to condense into the refrigerant W. The refrigerant generation efficiency of the refrigerant generator 20 can therefore be improved.

The smaller the outer diameter of the channels 34, the larger the number of channels 34 allowed to be disposed in the internal space 35. On the other hand, the smaller the outer diameter of the channels 34, the smaller the surface area of each of the channels 34. However, the number of channels 34 allowed to be disposed in the internal space 35 can be increased. As a result, the sum of the surface areas of the plurality of channels 34 is readily increased. The refrigerant generation efficiency of the refrigerant generator 20 can therefore be improved.

Since the refrigerant generation efficiency of the refrigerant generator 20 can be improved, the size of the first heat exchanger 30 can be reduced with the amount of generated refrigerant W in the first heat exchanger 30 maintained. The size of the projector 1 can thus be reduced.

The larger the number of channels 34 as described above, the smaller the gap between the channels 34. In this case, an increase in pressure loss that occurs in the air AR2 flowing through the internal space 35, unevenness of the flow of the air AR2, and other phenomena conceivably hinder the flow of the air AR2 in the internal space 35. However, the longer the period for which the air AR2 stays in the internal space 35, the longer the period for which the water vapor contained in the air AR2 is allowed to condense. A larger amount of refrigerant W can therefore be produced from the air AR2 by increasing the number of channels 34 to hinder the flow of the air AR2 to some extent in the internal space 35. The refrigerant generation efficiency of the refrigerant generator 20 can therefore be further improved.

For example, when the air from the second blower is caused to flow into the plurality of channels to allow the refrigerant W to be generated in the plurality of channels, the refrigerant W could clog the channels. In particular, when the environment in which the projector 1 is installed has a relatively low temperature, the refrigerant W could condense and clog the channels.

In contrast, according to the present embodiment, the refrigerant W is generated not in the channels 34 but in the internal space 35. The generated refrigerant W will therefore not clog the channels 34. Further, the refrigerant W is readily collected at a single location in the internal space 35 as compared with the case where the refrigerant W is generated in the plurality of channels 34. Therefore, even when the attitude of the projector 1 is changed, the refrigerant sender 50 readily delivers the refrigerant W in the internal space 35 to the cooling target.

For example, when the air from the second blower is caused to flow into the plurality of channels to generate the refrigerant W in the plurality of channels, the air in the plurality of channels is cooled by externally delivering air to the channels. In this case, the state of the external air delivering tends to vary in the plurality of channels. The degree of the generation of the refrigerant W could vary on a channel basis.

In contrast, according to the present embodiment, the cooling air AR3 flowing through the interior of the channels 34 cools the air AR2 in the internal space 35. Uniformly arranging the channels 34 in the internal space 35 therefore tends to result in uniform cooling of the entire air AR2 in the internal space 35. The refrigerant W can therefore be readily generated in the internal space 35, whereby the refrigerant generation efficiency of the refrigerant generator 20 can be further improved.

Causing the cooling air AR3 to flow through the channels 34 at a relatively high flow speed allows the cooling air AR3 to more readily cool the air AR2 in the internal space 35. On the other hand, causing the cooling air AR3 to flow at a relatively high flow speed tends to increase the noise produced by the flow of the cooling air AR3. In the present embodiment, however, the cooling air AR3 passes through the interior of the channels 34 disposed in the internal space 35, and noise produced by the flow of the cooling air AR3 is therefore unlikely to leak out of the enclosure 31. An increase in the noise produced by the projector 1 can therefore be suppressed with the flow speed of the cooling air AR3 relatively increased and the efficiency at which the air AR2 is cooled in the internal space 35 improved.

The channel area of the channels 34 is smaller than the channel area of the internal space 35. The flow speed of the cooling air AR3 flowing through the channels 34 therefore tends to be higher than the flow speed of the air AR2 flowing through the internal space 35. The cooling air AR3 is therefore readily allowed to flow at a relatively high flow speed in the channels 34. The cooling air AR3 therefore tends to preferably cool the air AR2 in the internal space 35 via the channels 34. The refrigerant generation efficiency of the refrigerant generator 20 can therefore be further improved.

On the other hand, the air AR2 is readily caused to flow through the internal space 35 at a relatively low flow speed. The period for which the air AR2 stays in the internal space 35 can therefore be prolonged. The period for which the water vapor in the air AR2 is caused to condense in the internal space 35 can in turn be prolonged, whereby the refrigerant W can be readily generated from the air AR2. The refrigerant generation efficiency of the refrigerant generator 20 can therefore be further improved.

According to the present embodiment, the refrigerant generator 20 includes the third blower 61, which delivers the cooling air AR3 into the plurality of channels 34. The cooling air AR3 is therefore readily delivered into the plurality of channels 34 to cool the air AR2 in the internal space 35 via the channels 34.

According to the present embodiment, the third blower 61 delivers the cooling air AR3 into the plurality of channels 34 through the flow-in duct 32, to which the flow-in ports 34a of the plurality of channels 34 are open, via the flow-in ports 34a. The flow-in duct 32 can therefore guide the cooling air AR3 exhausted from the third blower 61 into the channels 34. The cooling air AR3 can therefore be readily delivered into the channels 34.

According to the present embodiment, the end 54a of the connector 54 of the refrigerant sender 50 is exposed to the internal space 35. The end 54a of the connector 54 can therefore be in contact with the refrigerant W generated in the internal space 35. The connector 54 is formed of a porous member. The refrigerant W can therefore be absorbed by the connector 54 via the end 54a and sent to the cooling target based on capillarity. The refrigerant sender 50 can therefore readily send the refrigerant W generated in the internal space 35 to the cooling target. No pump or any other power source for sending the refrigerant W needs to be separately provided. An increase in the number of parts of the projector 1 can therefore be suppressed, whereby the size and weight of the projector 1 are readily further reduced.

For example, in the refrigerant generator 20, when the air AR2 delivered from the second blower 23 to the first heat exchanger 30 has a relatively low humidity, cooling the first heat exchanger 30 is unlikely to allow generation of the refrigerant W in some cases. For example, when air or any other substance outside the projector 1 mixes with the air AR2 delivered to the first heat exchanger 30, the humidity of the air AR2 lowers in some cases.

In contrast, according to the present embodiment, the refrigerant generator 20 has the circulation path 27, along which the air AR2 exhausted from the second blower 23 circulates. Substantially sealing the circulation path 27 can therefore suppress entry of air outside the projector 1 into the circulation path 27, whereby the humidity of the air AR2 delivered to the first heat exchanger 30 can be readily maintained relatively high. Cooling the internal space 35 via the plurality of channels 34 therefore allows preferable generation of the refrigerant W.

According to the present embodiment, the plurality of channels 34 extend in the direction (extension direction DE) that intersects the direction in which the air AR2 flows in the internal space 35 (rotational axis direction DR). The air AR2 therefore readily comes into contact with the surfaces of the plurality of channels 34 in the internal space 35, whereby the air AR2 is readily cooled. The refrigerant generation efficiency of the refrigerant generator 20 can therefore be further improved.

According to the present embodiment, the plurality of channels 34 are each a linearly extending conduit. The cooling air AR3 therefore readily flows through the channels 34. Further, the channels 34 can be readily produced, whereby the refrigerant generator 20 can be manufactured at a reduced cost.

According to the present embodiment, the plurality of channels 34 extend in parallel to one another. The plurality of channels 34 can therefore be readily arranged in the internal space 35 in a spatially efficient manner. The number of channels 34 is therefore readily increased. The refrigerant generation efficiency of the refrigerant generator 20 can therefore be further improved.

According to the present embodiment, the second heat exchanger 29 is provided in the circulation path 27, and the second heat exchanger 29 exchanges heat between the air AR2 flowing along the first path 27*a* and the air AR2 flowing along the second path 27*b*. The second heat exchanger 29 can therefore increase the temperature of the air AR2 flowing along the second path 27*b* while lowering the temperature of the air AR2 flowing along the first path 27*a*, as described above. The temperature of the air AR2 flowing from the first path 27*a* into the first heat exchanger 30 can thus be lowered. The water vapor contained in the air AR2 is therefore readily caused to condense in the first heat exchanger 30. The refrigerant generation efficiency of the refrigerant generator 20 can therefore be further improved.

Since the second heat exchanger 29 can raise the temperature of the air AR2 in the second path 27*b*, moisture tends to be preferably discharged into the air AR2 passing through a portion of the moisture absorbing/discharging member 40 that is the portion located in the second region F2 even when the heater 22 heats the moisture absorbing/discharging member 40 by a reduced degree. The energy that the heater 22 uses to heat the moisture absorbing/discharging member 40 can thus be reduced. The energy necessary for generation of the refrigerant W can therefore be reduced, whereby the refrigerant generation efficiency of the refrigerant generator 20 can be further improved.

According to the present embodiment, the heater 22 includes the heating main body 22*a*, which heats the air AR2 in the second path 27*b*, and the second heat exchanger 29 exchanges heat between the air AR2 flowing along the first path 27*a* and the air AR2 flowing along the second path 27*b* through the region on the upstream of the heating main body 22*a*. The second heat exchanger 29 therefore transfers the heat of the air AR2 in the first path 27*a* to the air AR2 before heated by the heating main body 22*a* and therefore having a relatively low temperature. That is, the difference in temperature between the air AR2 that gives heat and the air AR2 that receives heat can be increased in the heat exchange in the second heat exchanger 29. The heat can therefore be readily transferred from the air AR2 in the first path 27*a* to the air AR2 in the second path 27*b*. The temperature of the air AR2 in the second path 27*b* can therefore be preferably raised with the temperature of the air AR2 in the first path 27*a* preferably lowered. The refrigerant generation efficiency of the refrigerant generator 20 can therefore be further improved.

According to the present embodiment, the second heat exchanger 29 exchanges heat between the air AR2 flowing along the first path 27*a* and the air AR2 flowing along the second path 27*b* via the heat transfer member 28. The heat transfer member 28 can thus readily and preferably transfer the heat. Therefore, the heat exchange efficiency of the second heat exchanger 29 can be improved, and the refrigerant generation efficiency of the refrigerant generator 20 can be further improved.

According to the present embodiment, the heat transfer member 28 includes the plurality of fins 28*b*, which protrude from the base 28*a* in the same direction. Part of the plurality of fins 28*b* is disposed in the first path 27*a*, and the remainder of the plurality of fins 28*b* is disposed in the second path 27*b*. The configuration in which the heat transfer member 28 extends over the first path 27*a* and the second path 27*b* therefore allows the second heat exchanger 29 to exchange heat. The number of parts of the refrigerant generator 20 can therefore be reduced, and the refrigerant generator 20 can be readily manufactured, as compared with a case where a separate heat transfer member is disposed in the first path 27*a* and another separate heat transfer member is disposed in the second path 27*b*.

According to the present embodiment, the second heat exchanger 29 includes the first proximity section 27*c*, which is so disposed as to be closer to the second path 27*b* than the other portions of the first path 27*a*, and the second proximity section 27*d*, which is so disposed as to be closer to the first path 27*a* than the other portions of the second path 27*b*. Therefore, in the second heat exchanger 29, the first path 27*a* and the second path 27*b* can be close to each other in the second heat exchanger 29. Heat can therefore be readily exchanged between the air AR2 flowing along the first path 27*a* and the air AR2 flowing along the second path 27*b* via the wall that forms the first path 27*a* and the wall that forms the second path 27*b*. The heat can therefore be readily transferred from the air AR2 in the first path 27*a* to the air AR2 in the second path 27*b*, whereby the refrigerant generation efficiency of the refrigerant generator 20 can be further improved. Further, since the first path 27*a* and the second path 27*b* are close to each other in the second heat exchanger 29, the heat transfer member 28 is readily so disposed as to extend over the first path 27*a* and the second path 27*b*. The second heat exchanger 29 can thus be readily manufactured.

According to the present embodiment, the first proximity section 27*c* is formed of the first overhang 25*c* as the first contact section, which is in contact with the second duct 26, and the second proximity section 27*d* is formed of the second overhang 26*c* as the second contact section, which is in contact with the first contact section. Heat can therefore be readily exchanged between the air AR2 flowing through the first overhang 25*c* and the air AR2 flowing through the second overhang 26*c* via the first overhang 25*c* and the second overhang 26*c* being in contact with each other. Therefore, the heat exchange efficiency of the second heat exchanger 29 can be improved, and the refrigerant generation efficiency of the refrigerant generator 20 can be further improved.

According to the present embodiment, the direction in which the air AR2 flows through the first proximity section 27*c* is opposite the direction in which the air AR2 flows through the second proximity section 27*d*. It is known that the efficiency of heat exchange between two flows adjacent to each other and flowing in opposite directions is higher than the efficiency of heat exchange between the two flows adjacent to each other and flowing in the same direction. Therefore, when the direction in which the air AR2 flows through the first proximity section 27*c* is opposite the direction in which the air AR2 flows through the second proximity section 27d, the efficiency of the heat exchange between the air AR2 in the first proximity section 27c and the air AR2 in the second proximity section 27d can be improved. The refrigerant generation efficiency of the refrigerant generator 20 can therefore be further improved.

According to the present embodiment, the first blower 60 is the cooling blower that delivers the air AR1 to the light modulation units 4R, 4G, and 4B, which form the cooling target. The air AR1 therefore readily causes the refrigerant W sent to the light modulation units 4R, 4G, and 4B to vaporize, whereby the light modulation units 4R, 4G, and 4B can be further cooled. Further, no cooling blower that cools the cooling target needs to be provided separately from the first blower 60, whereby an increase in the number of parts of the projector 1 can be suppressed, and an increase in noise produced by the projector 1 can be suppressed.

In the present embodiment, the first blower 60, which is an intake fan that takes outside air into the projector 1, is used to facilitate the vaporization of the refrigerant W delivered to the cooling target, as described above. The same cooling performance as that provided when no cooler 10 is provided can therefore be provided even when the output of the first blower 60 is lowered. The noise produced by the first blower 60 can therefore be reduced by lowering the output of the first blower 60, which is an intake fan, whereby the quietness of the projector 1 can be further improved.

According to the present embodiment, the heater 22 includes the heating main body 22a, which heats the air before passing through a portion of the moisture absorbing/discharging member 40 that is the portion located in the second region F2, and the second blower 23. The heater 22, in which the second blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant holder 71, which holds the refrigerant W, is provided in the light modulation units 4R, 4G, and 4B, which form the cooling target. The refrigerant holder 71 therefore allows the refrigerant W sent to the light modulation units 4R, 4G, and 4B to be held at the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holder 71 is attached to surfaces of the light modulation units 4R, 4G, and 4B, which form the cooling target, and the refrigerant holder 71 is formed of a porous member. At least part of the refrigerant holder 71 is exposed when viewed in the layering direction from the side facing the refrigerant holder 71. The refrigerant W therefore readily vaporizes via the exposed portion of the refrigerant holder 71, whereby the cooling performance of the cooler 10 can be further improved. Further, the refrigerant holder 71, which is formed of a porous member, readily uniformly distributes the refrigerant W across the surfaces of the cooling target, which is provided with the refrigerant holder 71, based on capillarity, whereby the cooling target is readily further cooled.

For example, when the refrigerant holder 71 is fixed to the holding frames 80 with an adhesive, the pores in the refrigerant holder 71, which is formed of a porous member, are closed in some cases with the adhesive absorbed by the refrigerant holder 71. The resultant refrigerant holder 71 is therefore unlikely to absorb or hold the refrigerant W in some cases.

In contrast, according to the present embodiment, the fixing members 72 are so provided as to fix the refrigerant holder 71 in such a way that the fixing members 72 and the holding frames 80 sandwich the refrigerant holder 71. The refrigerant holder 71 can therefore be fixed to the holding frames 80 with use of no adhesive. The situation in which the refrigerant holder 71 is unlikely to hold the refrigerant W can therefore be suppressed. Further, in the present embodiment, the fixing members 72 are made of metal. The fixing members 72 therefore have relatively high thermal conductivity and are hence likely to be cooled. The air AR1 from the first blower 60 and the vaporization of the refrigerant W is therefore likely to lower the temperature of the fixing members 72, whereby the cooling target, which is in contact with fixing members 72, is readily further cooled.

According to the present embodiment, the refrigerant holder 71G is provided on a surface of the holding frame 80 that is the surface facing the light incident side of the light modulator 4GP. The configuration described above can suppress influence of the water vapor that is the refrigerant W having vaporized from the refrigerant holder 71G on the light outputted from the light modulator 4GP to the light combining system 5 and can therefore suppress formation of noise in an image projected from the projector 1.

According to the present embodiment, the refrigerant holders 71R, 71G, and 71B are provided in the plurality of light modulation units 4R, 4G, and 4B, and the linkage parts 73a and 73b, which link a plurality of the refrigerant holders 71R, 71G, and 71B to each other, are provided. Coupling the refrigerant sender 50 to one of the refrigerant holders 71R, 71G, and 71B therefore allows the refrigerant W to be sent to the other refrigerant holders 71. The routing of the refrigerant sender 50 in the projector 1 can therefore be simplified.

According to the present embodiment, the linkage parts 73a and 73b are provided with the respective coatings 74, which cover the linkage parts 73a and 73b. A situation in which the refrigerant W that moves along the linkage parts 73a and 73b vaporizes via the linkage parts 73a and 73b can therefore be suppressed. Therefore, a situation in which the refrigerant W vaporizes without contributing to the cooling of the light modulation units 4R, 4G, and 4B, which form the cooling target, can be suppressed, whereby waste of the generated refrigerant W can be suppressed.

In the present embodiment, the connector 54 may also be covered, as are the linkage parts 73a and 73b. The configuration described above can suppress the vaporization of the refrigerant W being sent to the cooling target. Therefore, the refrigerant W can be efficiently sent to the cooling target, and waste of the generated refrigerant W can be further suppressed. The circumference of each of the connector 54 and the linkage parts 73a and 73b may instead be covered, for example, with a tube. A coating treatment that suppresses the vaporization may still instead be performed on the surface of each of the connector 54 and the linkage parts 73a and 73b.

Variation

Figure 11:
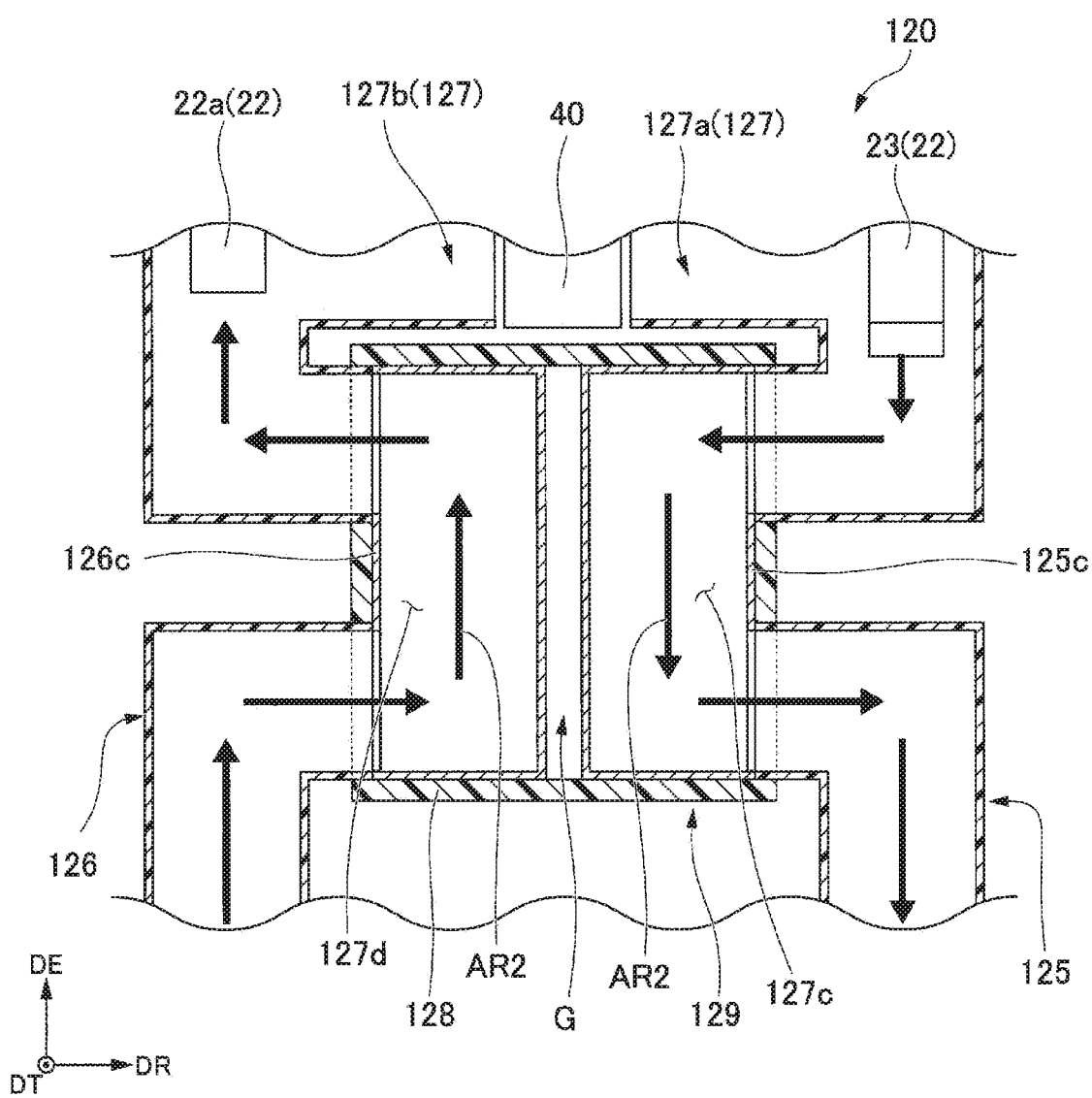
FIG. 11 shows part of a refrigerant generator according to a variation of the first embodiment.

In the present variation, the configuration of a second heat exchanger 129 differs from that in the refrigerant generator 20 described above. Configurations similar to those in the embodiment described above, for example, have the same reference characters as appropriate and will not be described in some cases. FIG. 11 shows part of a refrigerant generator 120 in the present variation.

In the refrigerant generator 120 in the present variation, a first overhang 125c of a first duct 125 and a second overhang 126c of a second duct 126 are so disposed as to be separate from each other by a gap G in the rotational axis direction DR. That is, the first overhang 125c and the second overhang 126c are not in contact with each other in the present variation. The first overhang 125c does not have the through hole 25d, unlike the first overhang 25c described above. The second overhang 126c does not have the through hole 26d, unlike the second overhang 26c described above.

The first overhang 125c forms a first proximity section 127c of a circulation path 127. The second overhang 126c forms a second proximity section 127d of the circulation path 127. The first overhang 125c and the second overhang 126c are made of metal. That is, the wall that forms the first proximity section 127c and the wall that forms the second proximity section 127d are made of metal. The first overhang 125c and the second overhang 126c is not necessarily made of a specific metal and is preferably made of copper or aluminum, each of which has relatively high thermal conductivity. In the present variation, a portion of the first duct 125 that is the portion other than the first overhang 125c is made of resin. In the present variation, a portion of the second duct 126 that is the portion other than the second overhang 126c is made of resin.

In the present variation, the second heat exchanger 129 differs from the second heat exchanger 29 described above and does not include the heat transfer member 28. The second heat exchanger 129 includes a heat insulating member 128, which surrounds at least part of the first path 127a and at least part of the second path 127b. In the present variation, the heat insulating member 128 accommodates the first overhang 125c, which forms the first proximity section 127c of the first path 127a, and the second overhang 126c, which forms the second proximity section 127d of the second path 127b. The heat insulating member 128 further accommodates the gap G provided between the first overhang 125c and the second overhang 126c and seals the gap G. The heat insulating member 128 is, for example, a heat insulating sheet.

In the second heat exchanger 129 in the present variation, the heat of the air AR2 flowing through the first proximity section 127c moves to the air AR2 flowing through the second proximity section 127d via the wall that forms the first proximity section 127c, the gap G, the wall that forms the second proximity section 127d. The second heat exchanger 129, therefore exchanges heat between the air AR2 flowing along the first path 127a and the air AR2 flowing along the second path 127b.

According to the present variation, the wall that forms the first proximity section 127c and the wall that forms the second proximity section 127d are made of metal. The heat of the air AR2 flowing through the first proximity section 127c is likely to be transferred to the wall that forms the first proximity section 127c, that is, the wall of the first overhang 125c. The heat transferred to the first overhang 125c is likely to be transferred to the wall that forms the second proximity section 127d, that is, the wall of the second overhang 126c and is likely to be transferred from the wall of the second overhang 126c to the air AR2 flowing through the second proximity section 127d. The heat of the air AR2 flowing through the first proximity section 127c is thus likely to be transferred to the air AR2 flowing through the second proximity section 127d. Therefore, for example, even when the gap G is provided between the first proximity section 127c and the second proximity section 127d, as in the present variation, heat is likely to be exchanged between the first proximity section 127c and the second proximity section 127d. The refrigerant generation efficiency of the refrigerant generator 120 can therefore be further improved.

According to the present variation, the second heat exchanger 129 includes the heat insulating member 128, which surrounds at least part of the first path 127a and at least part of the second path 127b. The heat insulating member 128 can therefore suppress leakage of the heat transferred from the air AR2 flowing along the first path 127a to the air AR2 flowing along the second path 127b to the ambient environment outside the second heat exchanger 129. The heat can therefore be preferably transferred from the air AR2 flowing along the first path 127a to the air AR2 flowing along the second path 127b, whereby the heat exchange efficiency of the second heat exchanger 129 can be improved. The refrigerant generation efficiency of the refrigerant generator 120 can therefore be further improved.

Second Embodiment

Figure 12:
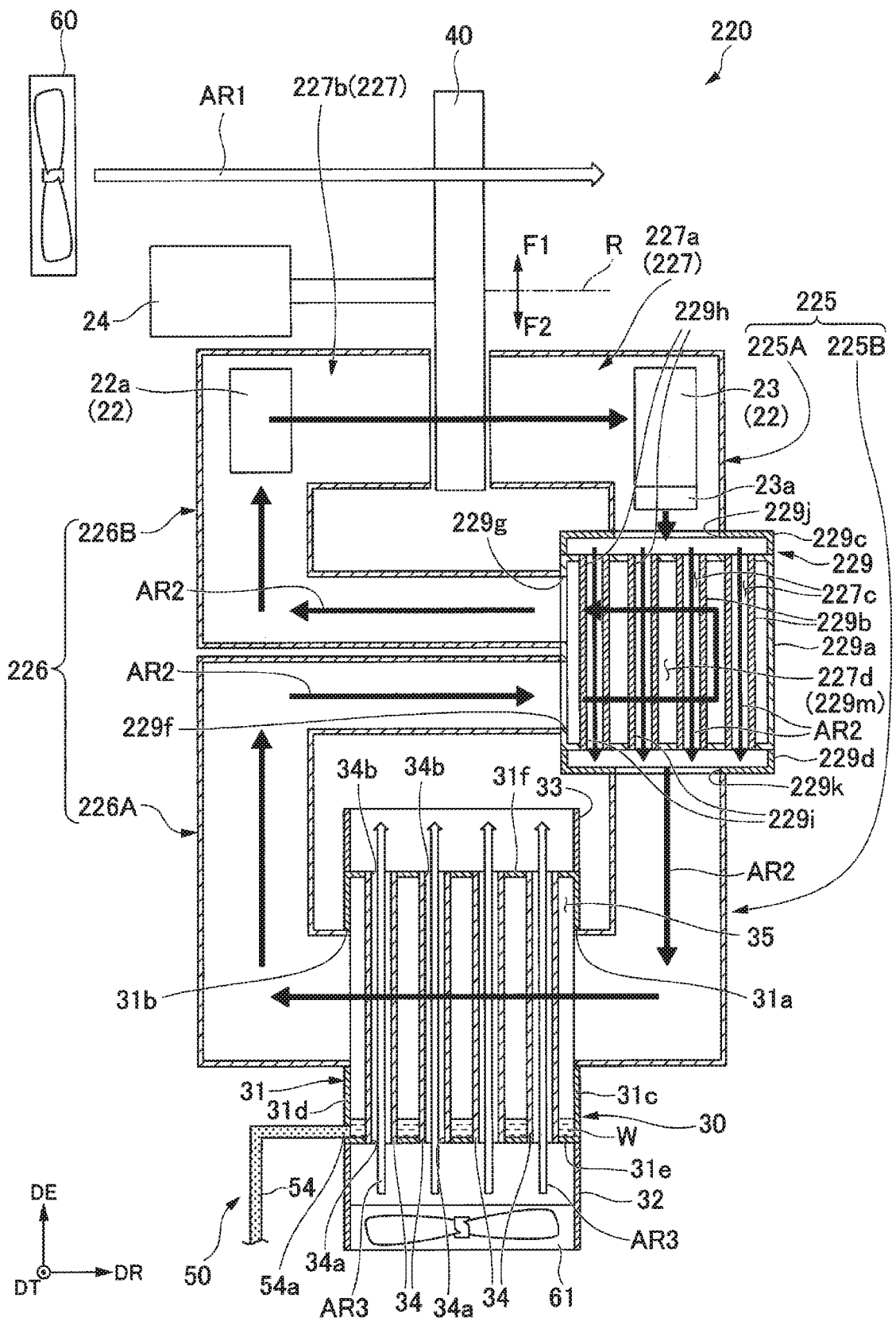
FIG. 12 is a schematic configuration diagram diagrammatically showing a refrigerant generator in a second embodiment.

The present variation differs from the first embodiment in terms of the configuration of a second heat exchanger 229. Configurations similar to those in the embodiment described above, for example, have the same reference characters as appropriate and will not be described in some cases. FIG. 12 is a schematic configuration diagram diagrammatically showing a refrigerant generator 220 in the present embodiment.

The second heat exchanger 229 in the present embodiment includes an enclosure 229a, a plurality of channels 229b, a first lid 229c, and a second lid 229d, as shown in FIG. 12. The enclosure 229a has, for example, the shape of a rectangular parallelepiped box. The enclosure 229a has an internal space 229m, a flow-in hole 229f, and a flow-out hole 229g. The air AR2 exhausted from the first heat exchanger 30 flows into the internal space 229m. The flow-in hole 229f and the flow-out hole 229g are provided in a sidewall of the enclosure 229a that is the sidewall on the other side in the rotational axis direction DR (−DR side). The flow-out hole 229g is located on a side of the flow-in hole 229f that is the one side in the extension direction DE (+DE side). The flow-in hole 229f and the flow-out hole 229g communicate with the internal space 229m of the enclosure 229a.

The plurality of channels 229b are disposed in the internal space 229m of the enclosure 229a. In the present embodiment, the plurality of channels 229b are each a linearly extending conduit along the extension direction DE. The channels 229b each have, for example, a cylindrical shape. The channels 229b are each open at the opposite ends thereof in the extension direction DE. The plurality of channels 229b extend, for example, in parallel to one another. In the present embodiment, although not shown, the channels 229b are formed by layering a plurality of rows, which are each formed of a plurality of the channels 229b arranged in the rotational axis direction DR, on each other in the thickness direction DT. The arrangement of the plurality of channels 229b in the enclosure 229a is, for example, the same as the arrangement of the plurality of channels 34 in the enclosure 31 of the first heat exchanger 30.

The channels 229b extend from a sidewall of the enclosure 229a that is the sidewall on the one side in the extension direction DE (+DE side) to a sidewall of the enclosure 229a that is the sidewall on the other side in the extension direction DE (−DE side). An end of each of the channels 229b that is the end on the one side in the extension direction DE (+DE side) is a flow-in port 229h, which is open via a surface of the enclosure 229a that is the surface on the one side in the extension direction DE to the ambient environment outside the enclosure 229a. An end of each of the channels 229b that is the end on the other side in the extension direction DE (−DE side) is a flow-out port 229i, which is open via a surface of the enclosure 229a that is the surface on the other side in the extension direction DE to the ambient environment outside the enclosure 229a. The channels 229b thus cause the spaces located on opposite sides of the enclosure 229a in the extension direction DE to communicate with each other. On the other hand, the interior of the plurality of channels 229b does not communicate with the interior of the enclosure 229a. The air flowing through the interior of the plurality of channels 229b is not mixed with the air having flowed into the internal space 229m of the enclosure 229a. That is, the interior of the plurality of channels 229b is isolated with the internal space 229m of the enclosure 229a.

The first lid 229c and the second lid 229d are so disposed as to sandwich the enclosure 229a in the extension direction DE and each coupled to the enclosure 229a. The first lid 229c is located on a side of the enclosure 229a that is the one side in the extension direction DE (+DE side). The second lid 229d is located on a side of the enclosure 229a that is the other side in the extension direction DE (−DE side).

The first lid 229c has the shape of a box that is open to the other side in the extension direction DE (−DE side). An opening of the first lid 229c that is the opening on the other side in the extension direction DE is closed by a sidewall of the enclosure 229a that is the sidewall on the one side in the extension direction DE (+DE side). The flow-in ports 229h of the plurality of channels 229b are open to the interior of the first lid 229c. The interior of the first lid 229c thus communicates with the interior of the plurality of channels 229b via the flow-in ports 229h. A coupling hole 229j is formed in a wall of the first lid 229c that is the wall on the one side in the extension direction DE.

The second lid 229d has the shape of a box that is open to the one side in the extension direction DE (+DE side). An opening of the second lid 229d that is the opening on the one side in the extension direction DE is closed by a sidewall of the enclosure 229a that is the sidewall on the other side in the extension direction DE (−DE side). The flow-out ports 229i of the plurality of channels 229b are open to the interior of the second lid 229d. The interior of the second lid 229d thus communicates with the interior of the plurality of channels 229b via the flow-out ports 229i. A coupling hole 229k is formed in a wall of the second lid 229d that is the wall on the other side in the extension direction DE.

In the present embodiment, a first duct 225 includes a first upstream duct 225A and a first downstream duct 225B. The first upstream duct 225A extends from a region of the moisture absorbing/discharging member 40 that is the region on the one side in the rotational axis direction DR (+DR side) to the first lid 229c of the second heat exchanger 229. One end of the first upstream duct 225A is open on the other side in the rotational axis direction DR (−DR side) toward a portion of the moisture absorbing/discharging member 40 that is the portion located in the second region F2. The other end of the first upstream duct 225A is coupled to the coupling hole 229j of the first lid 229c and is open to the interior of the first lid 229c. The interior of the first upstream duct 225A communicates with the interior of the first lid 229c.

The first downstream duct 225B extends from the second lid 229d of the second heat exchanger 229 to the enclosure 31 of the first heat exchanger 30. One end of the first downstream duct 225B is coupled to the coupling hole 229k and is open to the interior of the second lid 229d. The interior of the first downstream duct 225B communicates with the interior of the second lid 229d. The other end of the first downstream duct 225B is coupled to the flow-in hole 31a and is open to the internal space 35 of the enclosure 31. The interior of the first downstream duct 225B communicates with the internal space 35.

In the present embodiment, a second duct 226 includes a second upstream duct 226A and a second downstream duct 226B. The second upstream duct 226A extends from the enclosure 31 of the first heat exchanger 30 to the enclosure 229a of the second heat exchanger 229. One end of the second upstream duct 226A is coupled to the flow-out hole 31b and is open to the internal space 35 of the enclosure 31. The interior of the second upstream duct 226A communicates with the internal space 35. The other end of the second upstream duct 226A is coupled to the flow-out hole 229f and is open to the internal space 229m of the enclosure 229a. The interior of the second upstream duct 226A communicates with the internal space 229m of the enclosure 229a.

The second downstream duct 226B extends from the enclosure 229a of the second heat exchanger 229 to a region of the moisture absorbing/discharging member 40 that is the region on the other side in the rotational axis direction DR (−DR side). One end of the second downstream duct 226B is coupled to the flow-out hole 229g and is open to the internal space 229m of the enclosure 229a. The interior of the second downstream duct 226B communicates with the internal space 229m of the enclosure 229a. The other end of the second downstream duct 226B is open on the one side in the rotational axis direction DR (+DR side) toward a portion of the moisture absorbing/discharging member 40 that is the portion located in the second region F2.

In the present embodiment, a first path 227a of a circulation path 227 is formed of the first upstream duct 225A, the first lid 229c, the plurality of channels 229b, the second lid 229d, and the first downstream duct 225B. The air AR2 flowing along the first path 227a flows through the interior of the first upstream duct 225A, the interior of the first lid 229c, the interior of the plurality of channels 229b, the interior of the second lid 229d, and the interior of the first downstream duct 225B in this order.

In the present embodiment, a second path 227b of the circulation path 227 is formed of the second upstream duct 226A, the enclosure 229a, and the second downstream duct 226B. The air AR2 flowing along the second path 227b flows through the interior of the second upstream duct 226A, the internal space 229m of the enclosure 229a, and the interior of the second downstream duct 226B in this order.

According to the present embodiment, the second heat exchanger 229 includes a first section 227c formed of the plurality of channels 229b in the first path 227a and a second section 227d formed of the internal space 229m of the enclosure 229a in the second path 227d. The first section 227c passes through the second section 227d in the second heat exchanger 229 with the first section 227c isolated from the second section 227d. Heat can therefore be exchanged between the air AR2 flowing through the first section 227c and the air AR2 flowing through the second section 227d. Specifically, the heat of the air AR2 flowing through the plurality of channels 229b is transferred to the air AR2 flowing through the internal space 229m of the enclosure 229a. The second heat exchanger 229 therefore preferably exchanges heat between the air AR2 flowing along the first path 227a and the air AR2 flowing along the second path 227b. The refrigerant generation efficiency of the refrigerant generator 220 can therefore be improved.

Further, according to the present embodiment, the second heat exchanger 229 includes the enclosure 229a, which has the internal space 229m, which forms the second section 227d, and the plurality of channels 229b, which are disposed in the internal space 229m of the enclosure 229a and form the first section 227c. The heat of the air AR2 flowing through the interior of the plurality of channels 229b is therefore transferred via the surfaces of the plurality of channels 229b to the air AR2 flowing through the internal space 229m of the enclosure 229a. The area of the portion where the heat is transferred from the first path 227a to the second path 227b can thus be increased. Therefore, the heat exchange efficiency of the second heat exchanger 229 can be improved, and the refrigerant generation efficiency of the refrigerant generator 220 can be further improved.

The air AR2 exhausted from the first heat exchanger 30 and flowing into the second path 227b is the air having been cooled in the first heat exchanger 30 so that part of the water vapor in the air condenses into the refrigerant W and therefore has a relatively low temperature and a humidity of 100% or nearly 100%. The air AR2 flowing along the second path 227b therefore has a state in which the water vapor is likely to condense into the refrigerant W, as compared with the air AR2 flowing along the first path 227a. Therefore, for example, when part of the second path 227b is formed of the plurality of channels, the water vapor could condense in the plurality of channels, and the refrigerant W could clog the channels.

In contrast, according to the present embodiment, the plurality of channels 229b are the portion that forms the first section 227c, which is part of the first path 227a, and the internal space 229m of the enclosure 229a is the portion that forms the second section 227d, which is part of the second path 227b. Therefore, even when the water vapor in the air AR2 flowing along the second path 227b condenses into the refrigerant W, and the refrigerant W does not clog the channels 229b.

According to the present embodiment, the flow-in hole 229f and the flow-out hole 229g are provided in the same sidewall of the enclosure 229a. The period required for the air AR2 having flowed into the enclosure 229a via the flow-in hole 229f to be exhausted via the flow-out hole 229g is thus readily prolonged. The period for which the second heat exchanger 229 exchanges heat between the air AR2 flowing along the first path 227a and the air AR2 flowing along the second path 227b can therefore be prolonged. The refrigerant generation efficiency of the refrigerant generator 220 can therefore be further improved.

The present disclosure is not limited to the embodiments described above, and the following configurations can also be employed.

The second heat exchanger does not necessarily have a specific configuration and may have any configuration that allows heat exchange between the air flowing along the first path and the air flowing along the second path. The first proximity section may not be formed of the first overhang, and the second proximity section may not be formed of the second overhang. The first proximity section and the second proximity section may be formed of portions of the first duct and the second duct extending in such a way that the two ducts approach each other that are portions closest to each other. At least part of the wall that forms the first proximity section and at least part of the wall that forms the second proximity section may be made of metal. That is, only part of the wall that forms the first proximity section and only part of the wall that forms the second proximity section may be made of metal. The second heat exchanger may not include the first proximity section or the second proximity section. In this case, the heat transfer member may be so prolonged as to link the first path and the second path to each other.

The heat transfer member does not necessarily have a specific shape or is not necessarily made of a specific material. The heat transfer member may be formed of a plurality of heat transfer members. In a case where a plurality of heat sinks are provided as the heat transfer member, the heat sinks may be disposed in each of the first path and the second path and linked directly or indirectly to each other.

The first path or the second path may not be formed of a duct. The first path and the second path may each formed of a hole provided in a certain member. The first path and the second path may each be so formed that part thereof is formed of a duct and the other portion thereof is formed of a hole provided in a certain member. The first duct may be entirely made of metal. The second duct may be entirely made of metal. The first duct may include no first overhang. The second duct may include no second overhang.

In the above-mentioned variation of the first embodiment, the first overhang 125c and the second overhang 126c may be in contact with each other. In this case, the second heat exchanger 129 can more readily transfer the heat from the air AR2 flowing along the first path 127a to the air AR2 flowing along the second path 127b by the degree corresponding to no gap G. The refrigerant generation efficiency of the refrigerant generator 120 can therefore be further improved.

In the above-mentioned variation of the first embodiment, the heat transfer member 28 may be provided as in the refrigerant generator 20 described above. In this case, the heat transfer member 28 can also transfer the heat from the air AR2 flowing along the first path 127a to the air AR2 flowing along the second path 127b, whereby the heat exchange efficiency of the second heat exchanger 129 can be further improved. The refrigerant generation efficiency of the refrigerant generator 120 can therefore be further improved.

One of the first section that is part of the first path and the second section that is part of the second path may pass through the other one of the first and second sections with the one of the first and second sections isolated from the other. Specifically, in the second embodiment described above, part of the first path 227a may be formed of the internal space 229m of the enclosure 229a, and part of the second path 227b may be formed of the plurality of channels 229b. That is, the second section that is part of the second path may be formed of the plurality of channels and pass through the first section that is part of the first path and is formed of the enclosure.

The channels of the second heat exchanger do not necessarily have a specific configuration and may have any configuration in which the channels are disposed in the internal space of the enclosure and the interior of the channels are isolated from the internal space of the enclosure. The channels may each extend in the form of a curve. The channels may each not be a conduit and may, for example, be a columnar pillar disposed in the internal space of the enclosure and having a hole through which the cooling air passes. The plurality of channels may extend in different directions, and the number of channels is not limited to a specific number as long as the number is at least two.

The flow-in hole provided in the enclosure of the second heat exchanger and the flow-out hole provided in the enclosure are each not necessarily located in a specific position. For example, in the second embodiment described above, the flow-in hole 229f and the flow-out hole 229g may be provided in sidewalls of the enclosure 229a that are the sidewalls on the opposite sides in the rotational axis direction DR. In this case, the flow-in hole 229f and the flow-out hole 229g may or may not overlap with each other when viewed along the rotational axis direction DR.

The method for causing the cooling air to flow into the plurality of channels in the first heat exchanger is not limited to a specific method. For example, in the embodiments described above, the air AR1 exhausted from the first blower 60 may be caused to flow as the cooling air into the channels 34. The configuration described above eliminates the necessity to separately provide the third blower 61 and can suppress an increase in the number of parts of the projector 1. Further, an increase in the noise produced by the projector 1 can therefore be suppressed, as compared with the case where the third blower 61 is separately provided. In the configuration described above, the flow-in duct 32 may be configured to extend to a side of the moisture absorbing/discharging member 40 that is the side on the one side in the rotational axis direction DR (+DR side) to allows the air AR1 having passed through the moisture absorbing/discharging member 40 to flow into the flow-in duct 32.

The channels of the first heat exchanger do not necessarily have a specific configuration and may have any configuration in which the channels are disposed in the internal space and the interior of the channels is isolated from the internal space. The channels may each extend in the form of a curve. The channels may each not be a conduit and may, for example, be a columnar pillar disposed in the internal space and having a hole through which the cooling air passes. The plurality of channels may extend in different directions, and the number of channels is not limited to a specific number as long as the number is at least two.

The flow-in hole provided in the enclosure of the first heat exchanger and the flow-out hole provided in the enclosure are each not necessarily located in a specific position. For example, in the embodiments described above, the flow-in hole 31a and the flow-out hole 31b may be so disposed as not to overlap with each other when viewed along the rotational axis direction DR. The flow-in hole 31a and the flow-out hole 31b may be provided in the same sidewall of the enclosure 31. In this case, the air AR2 is likely to be allowed to stay in the internal space 35, whereby the refrigerant generation efficiency is likely to be improved.

The refrigerant generator may include an external blower that delivers air from the ambient environment outside the enclosure of the first heat exchanger into the enclosure. The external blower can, for example, be an external blower 160 drawn by the two-dot chain lines in FIG. 5. The external blower 160 is located on a side of the enclosure 31 that is the side on the other side in the thickness direction (−DT side). The external blower 160 is, for example, an axial fan. The external blower 160 delvers air AR4 from the ambient environment outside the enclosure 31 into the enclosure 31. In more detail, the external blower 160 delivers the air AR4 from a side of the enclosure 31 to another side thereof, that is, from the other side in the thickness direction DT (−DT side) to the one side therein (+DT side). The external blower 160 can deliver the air AR4 to cool the air AR2 in the internal space 35 externally by using the air outside the enclosure 31. The configuration described above allows further condensation of the water vapor contained in the air AR2 and further improvement in the refrigerant generation efficiency. The external blower 160 may instead be a centrifugal fan.

A plurality of fins may be provided on the inner wall surface of the enclosure of the first heat exchanger, that is, the inner surface that forms the internal space. In this case, the area of the inner surface that forms the internal space can be increased, whereby the water vapor contained in the air is allowed to be likely to condense on the inner surface that forms the internal space. The refrigerant generation efficiency can thus be improved. When the external blower described above is provided, in particular, the enclosure is cooled and the air in the internal space is therefore cooled via the inner surface that forms the internal space, whereby the water vapor is more likely to condense on the inner surface that forms the internal space.

A plurality of fins may be provided on the outer wall surface of the enclosure of the first heat exchanger. According to the configuration, heat is readily dissipated out of the enclosure from the interior of the enclosure. The air in the internal space is thus readily cooled. In particular, the external blower described above delivers air to the plurality of fins provided on the outer wall surface of the enclosure to more readily cool the air in the internal space. The refrigerant generation efficiency can therefore be further improved.

The refrigerant sender may include a catcher formed of a porous member and disposed in the internal space. Linking the catcher to the connector allows the catcher to absorb the refrigerant generated in the internal space and send the absorbed refrigerant to the connector. The generated refrigerant is thus readily delivered to the cooling target with no waste.

The heater is not limited to that described in the embodiments described above. The heater may be in contact with the moisture absorbing/discharging member and heat the moisture absorbing/discharging member. In this case, the heater may not heat the air before passing through the moisture absorbing/discharging member.

The cooling blower in the embodiments described above is the first blower 60 provided in the refrigerant generator 20, but not necessarily. Another cooling blower may be provided separately from the blowers provided in the refrigerant generator 20. The refrigerant is not limited to a specific substance as long as the refrigerant can cool the cooling target and may be any substance other than water.

The cooling target in the embodiments described above is the light modulation units, but not necessarily. The cooling target may include at least one of the light modulators, the light modulation units, the light source, a wavelength converter that converts the wavelength of the light outputted from the light source, a diffuser that diffuses the light outputted from the light source, and a polarization converter that converts the polarization direction of the light outputted from the light source. According to the configuration described above, the portions of the projector can be cooled in the same manner described above.

In the embodiments described above, the description has been made with reference to the case where the present disclosure is applied to a transmission-type projector, and the present disclosure is also applicable to a reflection-type projector. The term "transmission-type" means that the light modulators each including a liquid crystal panel or any other component transmit light. The term "reflection-type" means that the light modulators reflect light. The light modulators are each not limited, for example, to a liquid crystal panel and may, for example, be a micromirror-based light modulator.

In the embodiments described above, the projector using the three light modulators has been presented by way of example. The present disclosure is also applicable to a projector using only one light modulator and a projector using four or more light modulators.

The configurations described in the present specification can be combined with each other as appropriate to the extent that the combination causes no contradiction between the combined configurations.

What is claimed is:

1. A projector including a cooling target, the projector comprising:
   a light source configured to emit light;
   a light modulator configured to modulate the light emitted from the light source in accordance with an image signal; and
   a cooler configured to cool the cooling target based on transformation of a refrigerant into a gas,
   wherein the cooler includes
   a refrigerant generator configured to generate the refrigerant, and
   a refrigerant sender configured to send the generated refrigerant toward the cooling target,
   the refrigerant generator includes
   a rotating moisture absorbing/discharging member,
   a first blower configured to deliver air to a first portion of the moisture absorbing/discharging member that is a portion located in a first region,
   a first heat exchanger coupled to the refrigerant sender,
   a heater configured to heat a second portion of the moisture absorbing/discharging member that is a portion located in a second region different from the first region,
   a second blower configured to deliver air around the second portion heated by the heater to the first heat exchanger,
   a circulation path along which the air exhausted from the second blower circulates, and
   a second heat exchanger provided in the circulation path, the circulation path has
   a first path along which air after passing through the second portion located in the second region flows into the first heat exchanger, and
   a second path along which air exhausted from the first heat exchanger is delivered to the second portion located in the second region, and
   the second heat exchanger exchanges heat between the air flowing along the first path and the air flowing along the second path.

2. The projector according to claim 1,
wherein the heater includes a heating main body disposed in the second path,
the heating main body heats the air flowing through the second path, and
the second heat exchanger exchanges heat between the air flowing along the first path and the air flowing along the second path through a region on an upstream of the heating main body.

3. The projector according to claim 1,
wherein the second heat exchanger includes a heat transfer member, and
the second heat exchanger exchanges heat between the air flowing along the first path and the air flowing along the second path via the heat transfer member.

4. The projector according to claim 3,
wherein the heat transfer member includes
a base, and
a plurality of fins protruding from the base in a same direction,
part of the plurality of fins is disposed in the first path, and
another part of the plurality of fins is disposed in the second path.

5. The projector according to claim 1,
wherein the second heat exchanger includes
a first section that is part of the first path, and
a second section that is part of the second path, and
one of the first and second sections passes through the other of the first and second sections in the second heat exchanger with the one of the first and second sections isolated from the other.

6. The projector according to claim 5,
wherein the second heat exchanger includes
an enclosure having an internal space forming the second section, and
a plurality of channels disposed in the internal space, the channels forming the first section.

7. The projector according to claim 1,
wherein the second heat exchanger includes
a first proximity section that is part of the first path, the first proximity section disposed in a position closer to the second path than other sections of the first path, and
a second proximity section that is part of the second path, the second proximity section disposed in a position closer to the first path than other sections of the second path.

8. The projector according to claim 7,
wherein at least part of the first path is formed of a first duct,
at least part of the second path is formed of a second duct,
the first proximity section is formed of a first contact section of the first duct which is a section in contact with the second duct, and
the second proximity section is formed of a second contact section of the second duct which is a section in contact with the first contact section.

9. The projector according to claim 7,
wherein a direction in which air flows through the first proximity section is opposite a direction in which air flows through the second proximity section.

10. The projector according to claim 7,
wherein at least part of a wall forming the first proximity section and at least part of a wall forming the second proximity section are made of metal.

11. The projector according to claim 1,
wherein the second heat exchanger includes a heat insulating member surrounding at least part of the first path and at least part of the second path.

12. The projector according to claim 1,
wherein the cooling target is the light modulator.

* * * * *